(12) United States Patent
Gao

(10) Patent No.: US 11,290,217 B2
(45) Date of Patent: Mar. 29, 2022

(54) HARQ-ACK TRANSMISSION METHOD, TERMINAL DEVICE AND NETWORK DEVICE

(71) Applicant: DATANG MOBILE COMMUNICATIONS EQUIPMENT CO.,LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/278,332

(22) PCT Filed: Sep. 18, 2019

(86) PCT No.: PCT/CN2019/106511
§ 371 (c)(1),
(2) Date: Mar. 22, 2021

(87) PCT Pub. No.: WO2020/057566
PCT Pub. Date: Mar. 26, 2020

(65) Prior Publication Data
US 2021/0314094 A1    Oct. 7, 2021

(30) Foreign Application Priority Data

Sep. 21, 2018 (CN) .......................... 201811106837.9

(51) Int. Cl.
*H04L 1/18* (2006.01)
*H04L 5/00* (2006.01)
*H04W 72/04* (2009.01)

(52) U.S. Cl.
CPC .......... *H04L 1/1812* (2013.01); *H04L 1/1861* (2013.01); *H04L 5/0055* (2013.01); *H04W 72/042* (2013.01); *H04W 72/0413* (2013.01)

(58) Field of Classification Search
CPC ... H04L 1/1812; H04L 5/0055; H04L 1/1861; H04L 5/0048; H04L 1/1664;
(Continued)

(56) References Cited

U.S. PATENT DOCUMENTS 9,686,064 B2 *   6/2017 He .................. H04L 1/1861
10,587,386 B2 *  3/2020 Larsson ............ H04W 72/1289
(Continued)

FOREIGN PATENT DOCUMENTS

CN       103220795 A      7/2013
CN       103516496 A      1/2014
(Continued)

OTHER PUBLICATIONS

Nokia at al., "Remaining open items on UCI multiplexing", 3GPP TSG RAN WG1 Meeting #92bis, Sanya, China, Apr. 16-20, 2018, total 5 pages, R1-1804460.

*Primary Examiner* — Hanh N Nguyen
(74) *Attorney, Agent, or Firm* — Kilpatrick Townsend & Stockton, LLP

(57) ABSTRACT

Disclosed are an HARQ-ACK transmission method, a terminal device and a network device, specifying how to transmit an HARQ-ACK on a PUSCH configured with repeat transmission or a plurality of PUSCHs scheduled by the same PDCCH. The HARQ-ACK transmission method includes: if the HARQ-ACK is transmitted on at least one of the plurality of PUSCHs corresponding to a PDCCH in addition to a first PUSCH, ignoring a DAI in a DCI format used in the PDCCH when the HARQ-ACK is determined; and transmitting the determined HARQ-ACK on the at least one PUSCH.

20 Claims, 3 Drawing Sheets

(58) Field of Classification Search
CPC ....... H04L 1/1887; H04L 5/0057; H04L 1/08;
H04L 1/1854; H04L 1/1896; H04L
5/0091; H04W 72/0413; H04W 72/042;
H04W 72/1268; H04W 72/1289
See application file for complete search history.

(56) References Cited

U.S. PATENT DOCUMENTS

| | | | |
|---|---|---|---|
| 10,965,407 B2* | 3/2021 | Ying | H04L 1/1819 |
| 2010/0165939 A1* | 7/2010 | Lin | H04L 5/0053 |
| | | | 370/329 |
| 2014/0286208 A1 | 9/2014 | Papasakellariou et al. | |
| 2019/0320431 A1* | 10/2019 | Huang | H04L 5/0078 |
| 2021/0067275 A1* | 3/2021 | Takeda | H04L 1/1812 |
| 2021/0243778 A1* | 8/2021 | Takeda | H04W 72/1257 |

FOREIGN PATENT DOCUMENTS

| | | |
|---|---|---|
| CN | 104054291 A | 9/2014 |
| CN | 104427550 A | 3/2015 |
| CN | 105391528 A | 3/2016 |
| CN | 108271262 A | 7/2018 |
| WO | 2017078454 A1 | 5/2017 |

\* cited by examiner

US 11,290,217 B2

HARQ-ACK TRANSMISSION METHOD, TERMINAL DEVICE AND NETWORK DEVICE

The present application is a National Stage of International Application No. PCT/CN2019/106511, filed on Sep. 18, 2019, which claims priority to the Chinese Patent Application No. 201811106837.9, filed to the China National Intellectual Property Administration on Sep. 21, 2018, the entire contents of which are incorporated herein by reference.

FIELD

The present application relates to the field of communication and in particular to a hybrid automatic repeat request acknowledgement (HARQ-ACK) transmission method, a terminal device and a network device.

BACKGROUND

In the 5G (5-Generation) mobile communication technology, a new radio access technology (NR) of a network supports the repetition transmission of a PUSCH (Physical Uplink Shared Channel) and further supports that UCI (Uplink Control Information) carried on a PUCCH (Physical Uplink Control Channel) is transferred to be transmitted on the PUSCH when a time domain resource of the PUCCH is superimposed with a time domain resource of the PUSCH, avoiding parallel transmission of various channels. However, how to transmit the UCI on PUSCHs such as the PUSCH configured with repetition transmission or a plurality of PUSCHs scheduled by the same PDCCH (Physical Downlink Control Channel) has not been specified.

SUMMARY

Embodiments of the present application provide an HARQ-ACK transmission method, a terminal device and a network device in order to provide a new mechanism and specify how to transmit HARQ-ACK on a PUSCH configured with repetition transmission or a plurality of PUSCHs scheduled by the same PDCCH.

On a first aspect, provided is an HARQ-ACK transmission method. The transmission method includes: if HARQ-ACK is transmitted on at least one PUSCH of a plurality of PUSCHs in addition to a first PUSCH of the plurality of PUSCHs, ignoring a downlink assignment index (DAI) in a downlink control information (DCI) format used for one PDCCH when determining the HARQ-ACK, and the plurality of PUSCHs correspond to the PDCCH; and transmitting the determined HARQ-ACK on the at least one PUSCH.

In the embodiment of the present application, if the PUCCH carrying the HARQ-ACK is superimposed with the plurality of PUSCHs in addition to the first PUSCH, a terminal device may ignore the DAI in the DCI format used for the PDCCH and determine the HARQ-ACK carried on the plurality of PUSCHs. That is, a new mechanism is provided, and how to transmit HARQ-ACK on a PUSCH configured with repetition transmission or a plurality of PUSCHs scheduled by the same PDCCH is specified.

In one embodiment, the plurality of PUSCHs are repetition transmission of the same PUSCH or transport block (TB); or, the plurality of PUSCHs are transmissions of a plurality of independent PUSCHs scheduled by the same PDCCH.

In the embodiment of the present application, it is possible that there are various situations for the plurality of PUSCHs, for example, the plurality of PUSCHs may be the repetition transmission of the same PUSCH or the repetition transmission of the TB or the transmission of the plurality of independent PUSCHs scheduled by the same PDCCH, the plurality of PUSCHs are suitable for any situations to be relatively wide in application range.

In one embodiment, the DCI format is DCI format 0_1.

In one embodiment, the ignoring the DAI in the DCI format used for the PDCCH when determining the HARQ-ACK includes: determining the HARQ-ACK according to a determined method for HARQ-ACK transmission on a PUSCH without a corresponding PDCCH; or, determining the HARQ-ACK according to a determined method for HARQ-ACK transmission on a PUCCH, and replacing a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the ignoring the DAI in the DCI format used for the PDCCH when determining the HARQ-ACK includes: in the condition that a semi-static HARQ-ACK codebook is used, if no downlink transmission or semi-persistent scheduling (SPS) physical downlink shared channel (PDSCH) with corresponding HARQ-ACK to be transmitted on a PUSCH is received, determining no transmission of HARQ-ACK on the PUSCH; and/or, if only one downlink transmission with corresponding HARQ-ACK to be transmitted on a PUSCH is received and is scheduled by a PDCCH using a DCI format 1_0 with DAI value of 1, or, if only one SPS PDSCH with corresponding HARQ-ACK to be transmitted on a PUSCH is received (that is, when the HARQ-ACK corresponding to one SPS PDSCH only exists on the PUSCH), determining that the HARQ-ACK is HARQ-ACK corresponding to the downlink transmission or the SPS PDSCH; otherwise (that is, if only one downlink transmission with corresponding HARQ-ACK to be transmitted on a PUSCH is received and is scheduled by a PDCCH using a DCI format 1_0 with DAI value that is not equal to 1, or, if only one downlink transmission with corresponding HARQ-ACK to be transmitted on a PUSCH is received and is not scheduled by a PDCCH using DCI format 1_0, or, more than one downlink transmission is received, or, one downlink transmission and one SPS PDSCH are received), determining that the HARQ-ACK is a semi-static HARQ-ACK codebook determined according to a candidate time domain resource set for a downlink transmission and a feedback timing set between a downlink transmission and an HARQ-ACK.

In one embodiment, the ignoring the DAI in the DCI format used for the PDCCH when determining the HARQ-ACK includes: in the condition that a semi-static HARQ-ACK codebook is used, if no downlink transmission or SPS PDSCH with corresponding HARQ-ACK to be transmitted on a PUSCH is received, determining no transmission of HARQ-ACK on the PUSCH; and/or, if at least one downlink transmission with corresponding HARQ-ACK to be transmitted on a PUSCH is received, determining that the HARQ-ACK is a semi-static HARQ-ACK codebook determined according to a candidate time domain resource set for a downlink transmission and a feedback timing set between a downlink transmission and an HARQ-ACK, or, determining the HARQ-ACK according to a determined method for HARQ-ACK transmission on a PUCCH, and replacing a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the ignoring the DAI in the DCI format used for the PDCCH when determining the HARQ-ACK includes: in the condition that a dynamic HARQ-ACK codebook is used, if no downlink transmission or SPS PDSCH with corresponding HARQ-ACK to be transmitted on a PUSCH is received, determining no transmission of HARQ-ACK on the PUSCH; and/or, if at least one downlink transmission or SPS PDSCH with corresponding HARQ-ACK to be transmitted on a PUSCH is received, determining that the HARQ-ACK is a dynamic HARQ-ACK codebook determined according to a DAI in a PDCCH corresponding to the downlink transmission.

How to ignore the DAI in the DCI format used for the PDCCH and determine the HARQ-ACK in the embodiment of the present application is listed in the above-mentioned four optional ways.

In one embodiment, the downlink transmission is at least one of: SPS PDSCH release or PDSCH.

On a second aspect, provided is an HARQ-ACK transmission method. The transmission method includes: if the HARQ-ACK is transmitted on at least one PUSCH of a plurality of PUSCHs in addition to a first PUSCH of the plurality of PUSCHs, ignoring a DAI in a DCI format used for one PDCCH when determining the quantity of feedback bits of the HARQ-ACK, and the plurality of PUSCHs correspond to the PDCCH; and receiving the HARQ-ACK on the at least one PUSCH according to the quantity of the feedback bits of the HARQ-ACK.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the ignoring the DAI in the DCI format used for the PDCCH when determining the quantity of feedback bits of the HARQ-ACK includes: determining the quantity of the feedback bits of the HARQ-ACK according to a determined method for HARQ-ACK transmission on a PUSCH without a corresponding PDCCH; or, determining the quantity of the feedback bits of the HARQ-ACK according to a determined method for HARQ-ACK transmission on a PUCCH, and replacing a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the ignoring the DAI in the DCI format used for the PDCCH when determining the quantity of feedback bits of the HARQ-ACK includes: in the condition that a semi-static HARQ-ACK codebook is used, if no downlink transmission or SPS PDSCH with corresponding HARQ-ACK to be transmitted on a PUSCH is transmitted, determining no reception of HARQ-ACK on the PUSCH; and/or, if only one downlink transmission with corresponding HARQ-ACK to be transmitted on a PUSCH is transmitted and is scheduled by a PDCCH using a DCI format 1_0 with DAI value of 1, or, if only one SPS PDSCH with corresponding HARQ-ACK to be transmitted on a PUSCH is transmitted, determining that the quantity of the feedback bits of the HARQ-ACK is the quantity of feedback bits of the HARQ-ACK corresponding to the downlink transmission or the SPS PDSCH; otherwise, determining that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK.

In one embodiment, the ignoring the DAI in the DCI format used for the PDCCH when determining the quantity of feedback bits of the HARQ-ACK includes: in the condition that a semi-static HARQ-ACK codebook is used, if no downlink transmission or SPS PDSCH with corresponding HARQ-ACK to be transmitted on a PUSCH is transmitted, determining no reception of HARQ-ACK on the PUSCH; and/or, if at least one downlink transmission with corresponding HARQ-ACK to be transmitted on a PUSCH is transmitted, determining that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK, or, determining the quantity of the feedback bits of the HARQ-ACK according to a determined method for HARQ-ACK transmission on a PUCCH, and replacing a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the ignoring the DAI in the DCI format used for the PDCCH when determining the quantity of feedback bits of the HARQ-ACK includes: in the condition that a dynamic HARQ-ACK codebook is used, if no downlink transmission or SPS PDSCH with corresponding HARQ-ACK to be transmitted on a PUSCH is transmitted, determining no reception of HARQ-ACK on the PUSCH; and/or, if at least one downlink transmission with corresponding HARQ-ACK to be transmitted on a PUSCH is transmitted, determining that the quantity of feedback bits of the HARQ-ACK is the quantity of feedback bits of a dynamic HARQ-ACK codebook determined according to a DAI in a PDCCH corresponding to the downlink transmission.

In one embodiment, the downlink transmission is at least one of: SPS PDSCH release or PDSCH.

On a third aspect, provided is a terminal device. The terminal device includes: a memory, configured to store an instruction; a processor, configured to read the instruction in the memory and execute the following processes: if HARQ-ACK is transmitted on at least one PUSCH of a plurality of PUSCHs in addition to a first PUSCH of the plurality of PUSCHs, ignore a DAI in a DCI format used for one PDCCH when determining the HARQ-ACK, and the plurality of PUSCHs correspond to the PDCCH; and transmitting the determined HARQ-ACK on the at least one PUSCH; and a transceiver, configured to transmit or receive data under the control of the processor.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the processor is specifically configured to: determine the HARQ-ACK according to a determined method for HARQ-ACK transmission on a PUSCH without a corresponding PDCCH; or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the processor is specifically configured to: in the condition that a semi-static HARQ-ACK codebook is used, if no downlink transmission or semi-persistent scheduling (SPS) PDSCH with corresponding HARQ-ACK to be transmitted on a PUSCH is received, determine no transmission of HARQ-ACK on the PUSCH; and/or, if only one downlink transmission with corresponding HARQ-ACK to be transmitted on a PUSCH is received and is scheduled by a PDCCH using a DCI format 1_0 with DAI value of 1, or, if only one SPS PDSCH with corresponding HARQ-ACK to be transmitted on a PUSCH is received, determine that the HARQ-ACK is HARQ-ACK corresponding to the downlink transmission or the SPS PDSCH; otherwise, determine that the HARQ-ACK is a semi-static HARQ-ACK codebook determined according to a candidate time domain resource set for a downlink transmission and a feedback timing set between a downlink transmission and an HARQ-ACK.

In one embodiment, the processor is specifically configured to: in the condition that a semi-static HARQ-ACK codebook is used, if no downlink transmission or SPS PDSCH with corresponding HARQ-ACK to be transmitted on a PUSCH is received, determine no transmission of HARQ-ACK on the PUSCH; and/or, if at least one downlink transmission with corresponding HARQ-ACK to be transmitted on a PUSCH is received, determine that the HARQ-ACK is a semi-static HARQ-ACK codebook determined according to a candidate time domain resource set for a downlink transmission and a feedback timing set between a downlink transmission and an HARQ-ACK, or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the processor is specifically configured to: in the condition that a dynamic HARQ-ACK codebook is used, if no downlink transmission or SPS PDSCH with corresponding HARQ-ACK to be transmitted on a PUSCH is received, determine no transmission of HARQ-ACK on the PUSCH; and/or, if at least one downlink transmission or SPS PDSCH with corresponding HARQ-ACK to be transmitted on a PUSCH is received, determine that the HARQ-ACK is a dynamic HARQ-ACK codebook determined according to a DAI in a PDCCH corresponding to the downlink transmission.

In one embodiment, the downlink transmission is at least one of SPS PDSCH release or PDSCH.

On a fourth aspect, provided is a network device. The network device includes: a memory, configured to store an instruction; a processor, configured to read the instruction in the memory and execute the following processes: if HARQ-ACK is transmitted on at least one PUSCH of a plurality of PUSCHs in addition to a first PUSCH of the plurality of PUSCHs, ignoring a DAI in a DCI format used for one PDCCH when determining the quantity of feedback bits of the HARQ-ACK; and receiving the HARQ-ACK on the PUSCH according to the quantity of the feedback bits of the HARQ-ACK, and the plurality of PUSCHs correspond to the PDCCH; and a transceiver, configured to transmit or receive data under the control of the processor.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the processor is specifically configured to: determine the quantity of the feedback bits of the HARQ-ACK according to a determined method for HARQ-ACK transmission on a PUSCH without a corresponding PDCCH; or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the processor is specifically configured to: in the condition that a semi-static HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if only one downlink transmission with corresponding HARQ-ACK to be transmitted on a PUSCH is transmitted and is scheduled by a PDCCH using a DCI format 1_0 with DAI value of 1, or, if only one SPS PDSCH with corresponding HARQ-ACK to be transmitted on a PUSCH is transmitted, determine that the quantity of the feedback bits of the HARQ-ACK is the quantity of feedback bits of the HARQ-ACK corresponding to the downlink transmission or the SPS PDSCH; otherwise, determine that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK.

In one embodiment, the processor is specifically configured to: in the condition that a semi-static HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if at least one downlink transmission with corresponding HARQ-ACK to be transmitted on a PUSCH is transmitted, determine that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK, or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the processor is specifically configured to: in the condition that a dynamic HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if at least one downlink transmission with corresponding HARQ-ACK to be transmitted on a PUSCH is transmitted, determine that the quantity of feedback bits of the HARQ-ACK is the quantity of feedback bits of a dynamic HARQ-ACK codebook determined according to a DAI in a PDCCH corresponding to the downlink transmission.

In one embodiment, the downlink transmission is at least one of SPS PDSCH release or PDSCH.

On a fifth aspect, provided is a terminal device. The terminal device includes: a determination device, configured to: if HARQ-ACK is transmitted on at least one PUSCH of a plurality of PUSCHs in addition to a first PUSCH of the plurality of PUSCHs, ignore a DAI in a DCI format used for one PDCCH when determining the HARQ-ACK, and the plurality of PUSCHs correspond to the PDCCH; and a transmission device, configured to transmit the determined HARQ-ACK on the at least one PUSCH.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the determination device is specifically configured to: determine the HARQ-ACK according to a determined method for HARQ-ACK transmission on a PUSCH without a corresponding PDCCH; or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the determination device is specifically configured to: in the condition that a semi-static HARQ-ACK codebook is used, if no downlink transmission or semi-persistent scheduling (SPS) physical downlink shared channel (PDSCH) with corresponding HARQ-ACK to be transmitted on a PUSCH is received, determine no transmission of HARQ-ACK on the PUSCH; and/or, if only one downlink transmission with corresponding HARQ-ACK to be transmitted on a PUSCH is received and is scheduled by a PDCCH using a DCI format 1_0 with DAI value of 1, or, if only one SPS PDSCH with corresponding HARQ-ACK to be transmitted on a PUSCH is received, determine that the HARQ-ACK is HARQ-ACK corresponding to the downlink transmission or the SPS PDSCH; otherwise, determine that the HARQ-ACK is a semi-static HARQ-ACK codebook determined according to a candidate time domain resource set for a downlink transmission and a feedback timing set between a downlink transmission and an HARQ-ACK.

In one embodiment, the determination device is specifically configured to: in the condition that a semi-static HARQ-ACK codebook is used, if no downlink transmission or SPS PDSCH with corresponding HARQ-ACK to be transmitted on a PUSCH is received, determine no transmission of HARQ-ACK on the PUSCH; and/or, if at least one downlink transmission with corresponding HARQ-ACK to be transmitted on a PUSCH is received, determine that the HARQ-ACK is a semi-static HARQ-ACK codebook determined according to a candidate time domain resource set for a downlink transmission and a feedback timing set between a downlink transmission and an HARQ-ACK, or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the determination device is specifically configured to: in the condition that a dynamic HARQ-ACK codebook is used, if no downlink transmission or SPS PDSCH that HARQ-ACK on a PUSCH is received, determine no transmission of HARQ-ACK on the PUSCH; and/or, if at least one downlink transmission or SPS PDSCH with corresponding HARQ-ACK to be transmitted on a PUSCH is received, determine that the HARQ-ACK is a dynamic HARQ-ACK codebook determined according to a DAI in a PDCCH corresponding to the downlink transmission.

In one embodiment, the downlink transmission is at least one of SPS PDSCH release or PDSCH.

On a sixth aspect, provided is a network device. The network device includes: a determination device, configured to: if HARQ-ACK is transmitted on at least one PUSCH of a plurality of PUSCHs in addition to a first PUSCH of the plurality of PUSCHs, ignore a DAI in a DCI format used for one PDCCH when determining the quantity of feedback bits of the HARQ-ACK, and the plurality of PUSCHs correspond to the PDCCH; and a receiving device, configured to receive the HARQ-ACK on the at least one PUSCH according to the quantity of the feedback bits of the HARQ-ACK.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the determination device is specifically configured to: determine the quantity of the feedback bits of the HARQ-ACK according to a determined method for HARQ-ACK transmission on a PUSCH without a corresponding PDCCH; or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the determination device is specifically configured to: in the condition that a semi-static HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if only one downlink transmission with corresponding HARQ-ACK to be transmitted on a PUSCH is transmitted and is scheduled by a PDCCH using a DCI format 1_0 with DAI value of 1, or, if only one SPS PDSCH with corresponding HARQ-ACK to be transmitted on a PUSCH is transmitted, determine that the quantity of the feedback bits of the HARQ-ACK is the quantity of feedback bits of the HARQ-ACK corresponding to the downlink transmission or the SPS PDSCH; otherwise, determine that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK.

In one embodiment, the determination device is specifically configured to: in the condition that a semi-static HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if at least one downlink transmission with corresponding HARQ-ACK to be transmitted on a PUSCH is transmitted, determine that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK, or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the determination device is specifically configured to: in the condition that a dynamic HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if at least one downlink transmission with corresponding HARQ-ACK to be transmitted on a PUSCH is transmitted, determine that the quantity of feedback bits of the HARQ-ACK is the quantity of feedback bits of a dynamic HARQ-ACK codebook determined according to a DAI in a PDCCH corresponding to the downlink transmission.

In one embodiment, the downlink transmission is at least one of SPS PDSCH release or PDSCH.

On a seventh aspect, provided is a computer storage medium, storing a computer program, and the method according to any one of the first or second aspect is executed when the computer program is executed by a processor.

In the embodiments of the present application, if the PUCCH carrying the HARQ-ACK is superimposed with the plurality of PUSCHs in addition to the first PUSCH, the terminal device may ignore the DAI in the DCI format used for the one PDCCH and determine the HARQ-ACK carried on the plurality of PUSCHs. That is, a new mechanism is provided, and how to transmit HARQ-ACK on a PUSCH configured with repetition transmission or a plurality of PUSCHs scheduled by the same PDCCH is specified.

DETAILED DESCRIPTION OF THE EMBODIMENTS

Figure 1:
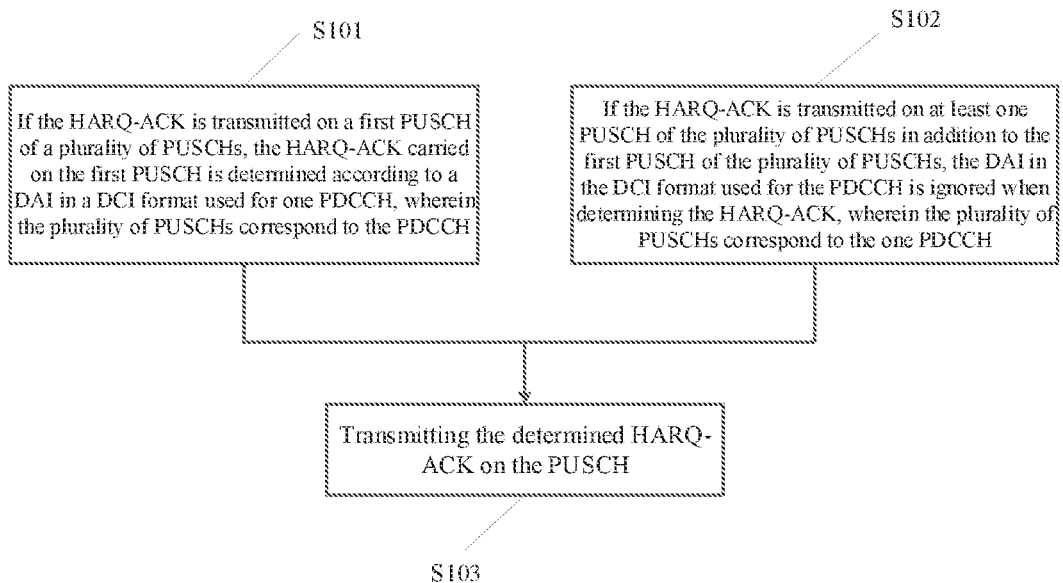
FIG. 1 is a schematic diagram showing a flow of an HARQ-ACK transmission method provided in an embodiment of the present application.

Embodiments of the present application will be clearly and completely described below in combination with accompanying drawings in the embodiments of the present application.

The background of the embodiments of the present application will be introduced below.

In an LTE (Long Term Evolution) wireless communication system, when a terminal device such as a UE (User Equipment) is simultaneously configured with PUSCH and UCI transmission in a subframe, it is possible that time domain resources of a PUCCH carrying UCI are superimposed with time domain resources of a PUSCH carrying UCI, if the UE supports the simultaneous transmission for the PUCCH and the PUSCH and a high-level signaling is configured to be capable of performing simultaneous transmission for the PUCCH and the PUSCH, transmission of the PUCCH and the PUSCH may be simultaneously performed, for example, the UCI is transmitted on the PUCCH, and data is transmitted on the PUSCH. If the UE does not support the simultaneous transmission for the PUCCH and the PUSCH or the high-level signaling is configured to be incapable of performing simultaneous transmission for the PUCCH and the PUSCH, the UCI carried on the PUCCH will be transferred to the PUSCH to be multiplexed and transmitted on the PUSCH together with information originally carried on the PUSCH. The UCI at least includes HARQ-ACK( ), CSI (Channel State Information) and an SR (Scheduling Request).

Particularly, for the PUSCH which is not configured to be repetition transmission, when the PUSCH is provided with a corresponding PDCCH (that is, UL grant scheduling) and the PDCCH adopts a DCI (Downlink Control Information) format 0_1, the DCI format 0_1 includes a 1-bit or 2-bit DAI (Downlink Assignment Index) generally called UL DAI and used for indicating a transmission situation of the HARQ-ACK on the PUSCH. If there is no DAI for indication in the DCI format 0_1, when receiving no downlink transmission requiring HARQ-ACK feedback on a time domain position where the PUSCH is located, the UE may determine that there is no HARQ-ACK transmission on the PUSCH; and when receiving a downlink transmission requiring HARQ-ACK feedback on the time domain position where the PUSCH is located, the UE may determine that there is an HARQ-ACK transmission on the PUSCH determined according to a configured codebook.

When the HARQ-ACK is configured to be transmitted by adopting a semi-static codebook, the DCI format 0_1 includes 1-bit DAI for indicating whether there is the HARQ-ACK transmission on the PUSCH, that is, the DAI is used for avoiding inconsistent understanding of the HARQ-ACK transmission on the PUSCH by a terminal and a base station due to the packet loss of the downlink transmission. When the HARQ-ACK is configured to be transmitted by adopting a dynamic codebook, the DCI format 0_1 includes 2-bit or 4-bit DAI for indicating the total bits of the HARQ-ACK transmission on the PUSCH, and if sub-codebooks (respective codebooks for a downlink transmission based on a TB and a downlink transmission based on CBG (coding block Group)) are adopted, each of the sub-codebooks corresponds to 2-bit DAI, there are 4-bit DAI in total. For the dynamic codebook, DCI (such as DCI format 0_1 or 1_1) used by a PDCCH (a PDCCH used for scheduling a PDSCH or indicating the release for a downlink SPS resource) in a PDCCH monitoring occasion set corresponding to the dynamic codebook also includes DAI which is generally called DL DAI; when there is single carrier, there are only 2-bit DAI; and when there are multiple carriers, there are 4-bit DAI including 2-bit C-DAI and 2-bit T-DAI which are respectively used for indicating the order and size of a codebook.

At present, a 5G NR system supports repetition transmission of a PUSCH and further supports transmission that UCI carried on a PUCCH is transferred to be on the PUSCH when the time domain resource of the PUCCH is superimposed with the time domain resource of the PUSCH, avoiding parallel transmission of various channels.

In 5G NR, when a PUCCH carrying HARQ-ACK is superimposed with a PUSCH configured with repetition transmission and the PUSCH is scheduled by a PDCCH using the DCI format 0_1, there is still no method for determining a codebook of the HARQ-ACK on the PUSCH according to the DAI in the DCI format 0_1.

In addition, for a transmission situation that a plurality of PUSCHs are scheduled by a PDCCH, for example, N PUSCHs in N slots starting from slot n+K2 are simultaneously scheduled to be transmitted by a PDCCH in slot n, or N values of K2 are given, the N PUSCHs in N slots determined based on the N values of K2 are scheduled to be transmitted, scheduling information of the PUSCHs in all the slots may be same or different, the PUSCH in each of the slots carries an independent TB, rather than that the repetition transmission is performed on one TB, that is, a PDCCH simultaneously carries scheduling information for scheduling the transmission of the plurality of PUSCHs in a plurality of slots. At the moment, there is still no method for determining a codebook of the HARQ-ACK on the PUSCH according to a DAI in the DCI format 0_1. That is, how to transmit UCI on a PUSCH configured with repetition transmission or a plurality of PUSCHs scheduled by the same PDCCH has not been specified at present.

In view of this, an embodiment of the present application provides a novel HARQ-ACK transmission method. In the method, if the PUCCH carrying the HARQ-ACK is superimposed with the plurality of PUSCHs in addition to the first PUSCH, the terminal device may ignore the DAI in the DCI format used for the PDCCH and determine the HARQ-ACK carried on the plurality of PUSCHs. That is, a new mechanism is provided, and how to transmit HARQ-ACK on a PUSCH configured with repetition transmission or a plurality of PUSCHs scheduled by the same PDCCH is specified.

The embodiment of the present application will be introduced below in combination with the accompanying drawings in the specification.

Referring to FIG. 1, an embodiment of the present application provides an HARQ-ACK transmission method, and a flow of the method is described as below. Since a process of interaction between a network device and a terminal device is involved in the HARQ-ACK transmission method, processes executed by the network device and the terminal device will be described together in the following description of the flow.

For the transmission of N PUSCHs scheduled by a PDCCH, HARQ-ACK carried on a PUSCH is determined to be different from another according to different superimposition situations between the PUCCH carrying the HARQ-ACK and a plurality of PUSCHs. In the embodiment of the present application, a way of determining the HARQ-ACK carried on the PUSCH according to a determination whether the PUCCH carrying the HARQ-ACK is superimposed with a first PUSCH includes two situations, i.e., steps S101 and S102.

S101, if the HARQ-ACK is transmitted on a first PUSCH of a plurality of PUSCHs, the HARQ-ACK carried on the first PUSCH is determined according to a DAI in a DCI format used for one PDCCH, and the plurality of PUSCHs correspond to the PDCCH.

S102, if the HARQ-ACK is transmitted on at least one PUSCH of the plurality of PUSCHs in addition to the first PUSCH of the plurality of PUSCHs, the DAI in the DCI format used for the PDCCH is ignored when determining the HARQ-ACK, and the plurality of PUSCHs correspond to the one PDCCH.

In the embodiment of the present application, the terminal device determines the HARQ-ACK carried on the PUSCH, then, in S103, the determined HARQ-ACK is transmitted on the PUSCH. For example, if the terminal device determines the HARQ-ACK carried on the first PUSCH under the situation in step S101, the HARQ-ACK is transmitted on the first PUSCH. If the terminal device determines the HARQ-ACK carried on other PUSCHs in addition to the first PUSCH under the situation in step S102, the HARQ-ACK is transmitted on other PUSCHs.

In the embodiment of the present application, the plurality of PUSCHs may are repetition transmission of the same PUSCH or TB, that is, when the transmission of a PUSCH is configured to occupy a plurality of transmission time devices, the PUSCH in each time device carries the same TB, and the transmission time devices may be slots or mini-slots, of course, the transmission time devices may also be other defined transmission time devices; and the plurality of PUSCHs may also are transmissions of a plurality of independent PUSCHs scheduled by the same PDCCH, that is, the combined scheduling of a plurality of uplink transmission time devices, that is, a PDCCH simultaneously carries scheduling signaling corresponding to a plurality of PUSCHs, and each of the PUSCHs carries an independent TB. The DCI format may be a DCI format including the DAI, such as the DCI format 0_1.

In the embodiment of the present application, there are following ways for ignoring the DAI in the DCI format used for the PDCCH when determining the HARQ-ACK.

A first way: the HARQ-ACK is determined according to a determined method for HARQ-ACK transmission on a PUSCH without a corresponding PDCCH (that is, PUSCH without a scheduling signaling, that is, a PUSCH without UL grant).

A second way: the HARQ-ACK is determined according to a determined method for HARQ-ACK transmission on a PUCCH, and a configuration parameter of HARQ-ACK corresponding to the PUCCH is replaced with a configuration parameter of HARQ-ACK corresponding to the PUSCH, and the configuration parameter of HARQ-ACK corresponding to the PUCCH is used for indicating whether the spatial bundling is used for the HARQ-ACK on the PUCCH, and the configuration parameter of HARQ-ACK corresponding to the PUSCH is used for indicating whether the spatial bundling is used for the HARQ-ACK on the PUSCH. That is, it is assumed that the HARQ-ACK is transmitted on the PUCCH, a sequence of the HARQ-ACK is determined according to a corresponding way, and a configuration parameter for spatial bundling of the HARQ-ACK corresponding to the PUCCH is replaced with a configuration parameter for spatial bundling of the HARQ-ACK corresponding to the PUSCH.

A third way: when a semi-static HARQ-ACK codebook is used:
  1) if no downlink transmission or SPS PDSCH with corresponding HARQ-ACK to be transmitted on a PUSCH is received, it is determined no transmission of HARQ-ACK on the PUSCH; and/or, 2) if only one downlink transmission that HARQ-ACK is required to be transmitted on a PUSCH is received and is scheduled by a PDCCH using a DCI format 1_0, and the DAI in the DCI format 1_0 is equal to 1, or, if only one SPS PDSCH with corresponding HARQ-ACK to be transmitted on a PUSCH is received, it is determined that the HARQ-ACK is HARQ-ACK corresponding to the downlink transmission or the SPS PDSCH (that is, 1-bit HARQ-ACK is only transmitted); otherwise, it is determined that the HARQ-ACK is a semi-static HARQ-ACK codebook determined according to a candidate time domain resource set for a downlink transmission and a feedback timing set between a downlink transmission and an HARQ-ACK.

A fourth way: when a semi-static HARQ-ACK codebook is used:

1) if no downlink transmission or SPS PDSCH with corresponding HARQ-ACK to be transmitted on a PUSCH is received, it is determined no transmission of HARQ-ACK on the PUSCH; and/or, 2) if at least one downlink transmission with corresponding HARQ-ACK to be transmitted on a PUSCH is received, it is determined that the HARQ-ACK is a semi-static HARQ-ACK codebook determined according to a candidate time domain resource set for a downlink transmission and a feedback timing set between a downlink transmission and an HARQ-ACK, or, the HARQ-ACK is determined according to a determined method for HARQ-ACK transmission on a PUCCH, and a configuration parameter of HARQ-ACK corresponding to the PUCCH is replaced with a configuration parameter of HARQ-ACK corresponding to the PUSCH, and the configuration parameter is used for indicating whether the spatial bundling is used for the HARQ-ACK.

A fifth way: when a dynamic HARQ-ACK codebook is used:

1) if no downlink transmission or SPS PDSCH with corresponding HARQ-ACK to be transmitted on a PUSCH is received, it is determined no transmission of HARQ-ACK on the PUSCH; and/or, 2) if at least one downlink transmission or SPS PDSCH with corresponding HARQ-ACK to be transmitted on a PUSCH is received, it is determined that the HARQ-ACK is a dynamic HARQ-ACK codebook determined according to a DAI in a PDCCH corresponding to the downlink transmission.

The above-mentioned downlink transmission in the first way to the fifth way may be at least one of: SPS PDSCH release (that is, a PDCCH indicating the release of a downlink SPS resource) and PDSCH.

The embodiment of the present application will be introduced below as a embodiment.

Firstly, a scenario that the HARQ-ACK is transmitted on the PUSCH is introduced: for example, the simultaneous transmission for the PUCCH and the PUSCH is not configured or supported, a time domain resource for the PUCCH carrying the HARQ-ACK is superimposed with a time domain resource for the PUSCH carrying the HARQ-ACK, and a time condition for UCI multiplexing (that is, UCI may be transferred from the PUCCH to the PUSCH so that the transmission on the PUCCH is no longer performed) is met, for example, starting positions of first symbols of earliest channels (if starting symbols of the PUCCH and the PUSCH are same, the channel with the largest transmission length is selected, and if both the starting symbols and the transmission lengths are consistent, any one of the PUCCH and the PUSCH is selected) in the PUCCH and the PUSCH are not earlier than a time point, and time point 1 is a position obtained based on predetermined time length after the last symbol of the last SPS PDSCH release/PDSCH requiring HARQ-ACK feedback on the PUCCH, and time point 2 is a position obtained based on predetermined time length after the last symbol of a PDCCH corresponding to the SPS PDSCH release/PDSCH requiring HARQ-ACK feedback on the PUCCH.

Figure 2:
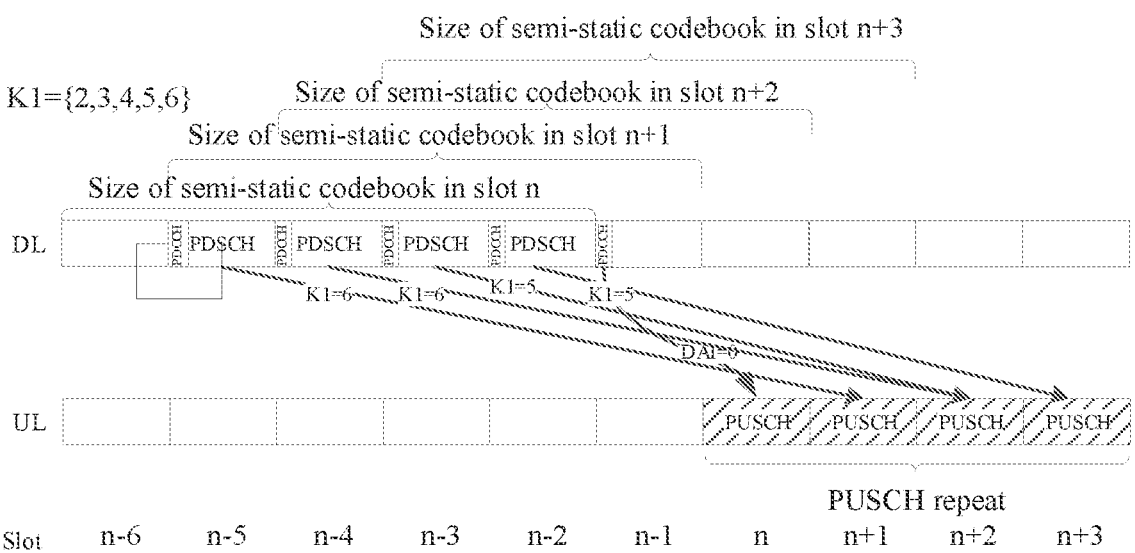
FIG. 2 is a schematic diagram showing scheduling and feedback in a first embodiment of the present application.

First embodiment: referring to FIG. 2, FIG. 2 is a schematic diagram showing scheduling and feedback and is applied to the above-mentioned scenario. FIG. 2 is described with an FDD (Frequency Division Duplex) system as an example. There are an uplink resource and a downlink resource in each slot, it is assumed that a time sequence set K1 of HARQ-ACK feedback is equal to {2,3,4,5,6}, and K1 takes a slot as a device and is used for determining a slot, in which the transmission of a PUCCH carrying HARQ-ACK on a PDSCH is performed, according to a slot in which the transmission of the PDSCH is performed. It is assumed that at most one PDSCH is transmitted in each downlink slot, a semi-static HARQ-ACK codebook is configured to be used, then, it may be determined that the semi-static codebook corresponding to each uplink slot shown in FIG. 2 includes 5 possible PDSCH transmission positions according to a set K1 and a candidate time domain resource set for the PDSCH (the candidate time domain resource set of the PDSCH may be embodied as a preconfigured table including a plurality of rows, each row corresponds to a time slot in which a PDSCH is located and a time domain position in the slot, such as a starting symbol position and configuration information of symbol length, and the time slot in which the PDSCH is located is determined by scheduling time sequence K0 which represents a slot interval between the PDCCH for scheduling the PDSCH and the PDSCH), and it is assumed that each PDSCH corresponds to 1-bit HARQ-ACK, the size of a semi-static codebook corresponds to each slot is 5 bits. It is assumed that a base station transmits a PDCCH (UL grant) adopting DCI format 0_1 in slot n−1 to schedule a terminal device to perform repetition transmission of the PUSCH in slots n to n+3, that is, the PUSCH in each slot carries the same TB, and is configured with the same parameters such as a time-frequency domain resource and an MCS. It is assumed that PDSCH transmission requiring HARQ-ACK feedback in slot n does not exist in a candidate PDSCH occasion set (that is, slots n−6 to n−2) corresponding to slot n, the network device sets 1-bit DAI in the DCI format 0_1 for scheduling the PUSCH as 0, which represents that there is no HARQ-ACK on the PUSCH. It is assumed that the terminal device does not support or is not configured with the simultaneous transmission for the PUCCH and the PUSCH, the HARQ-ACK is determined according to the following ways.

In slot n, since the terminal device does not receive any downlink transmission or SPS PDSCH requiring HARQ-ACK feedback in slot n, it is determined that the HARQ-ACK is not required to be transmitted on the PUSCH according to that the 1-bit DAI in the DCI format 0_1 for scheduling the PUSCH is 0. It should be noted that no downlink transmission or SPS PDSCH is received means that no downlink transmission with corresponding HARQ-ACK to be transmitted on a PUSCH (that is, it is determined whether the HARQ-ACK feedback is performed in the slot in which the PUSCH is performed according to values of K1 corresponding to the downlink transmissions, if so, the downlink transmission is the downlink transmission that the HARQ-ACK is required to be transmitted on the PUSCH, the same below, and the descriptions thereof are omitted herein) is received in a downlink transmission occasion set corresponding to a semi-static HARQ-ACK codebook (for example, the downlink transmission occasion set corresponding to the semi-static HARQ-ACK codebook in slot n in FIG. 2 is formed by a downlink transmission occasion existing in each of slots n−6 to n−2, there are 5 downlink transmission occasions in total, and the downlink transmission occasion set is determined according to the set K1 and the candidate time domain resource set of the PDSCH, the same below, and the descriptions thereof are omitted herein).

In slot n+1, a PDSCH in slot n−5 requires HARQ-ACK feedback in slot n+1 according to the scheduling of the network device, and it is assumed that a PUCCH resource carrying the HARQ-ACK is superimposed with a PUSCH resource in slot n+1, since the terminal device does not support or is not configured with the simultaneous transmission for the PUCCH and the PUSCH, when a time condition of UCI multiplexing is met, the HARQ-ACK on the PUCCH is required to be transferred for transmission on the PUSCH, and the PUCCH is no longer transmitted. At the moment, whether the value of 1-bit DAI in the DCI format 0_1 scheduling the repetition transmission of the PUSCH is 0 is not taken into account, and several ways are further provided as follows.

Way 1: the HARQ-ACK is determined according to a determined method for HARQ-ACK transmission on a PUSCH without a corresponding PDCCH. That is, processing is performed according to a situation that no corresponding PDCCH schedules the PUSCH. Since only one downlink transmission is received, if the downlink transmission is scheduled by the DCI format 1_0 in which the DAI value is equal to 1, HARQ-ACK feedback for the one downlink transmission is only performed on the PUSCH, that is, 1-bit HARQ-ACK (fallback of semi-static codebook) is only transmitted according to the above-mentioned assumption. Otherwise, that is, if the downlink transmission is scheduled by the DCI format 1_0 in which the DAI value is not equal to 1, or if the downlink transmission is not scheduled by the DCI format 1_0, or more than one downlink transmission and/or SPS PDSCH is received, the HARQ-ACK is transmitted on the PUSCH according to the size of a semi-static codebook corresponding to slot n+1, that is, 5-bit HARQ-ACK is transmitted. NACK (serving as a placeholder) is generated on a position where no PDSCH is received.

Way 2: the HARQ-ACK is determined according to a determined method for HARQ-ACK transmission on a PUCCH. Specifically, the HARQ-ACK is determined according to a determined method for HARQ-ACK transmission on a PUCCH, and a configuration parameter for spatial bundling of the HARQ-ACK corresponding to the PUCCH is replaced with a configuration parameter for spatial bundling of the HARQ-ACK corresponding to the PUSCH. Spatial bundling is not involved in the first embodiment, and therefore, the HARQ-ACK is directly determined according to the method of transmission on the PUCCH.

Since only one downlink transmission is received, if the downlink transmission is scheduled by the DCI format 1_0 in which the DAI value is equal to 1, HARQ-ACK feedback for the one downlink transmission is only performed on the PUSCH, that is, 1-bit HARQ-ACK (fallback of semi-static codebook) is only transmitted according to the above-mentioned assumption. If the downlink transmission is scheduled by the DCI format 1_0, and the DAI in the DCI format 1_0 is not equal to 1, or if the downlink transmission is not scheduled by the DCI format 1_0, or more than one downlink transmission and/or SPS PDSCH is received, the HARQ-ACK is transmitted on the PUSCH according to the size of a semi-static codebook corresponding to slot n+1, that is, 5-bit HARQ-ACK is transmitted. NACK (serving as a placeholder) is generated on a position where no PDSCH is received.

Way 3: the HARQ-ACK is determined according to a judgment whether only one downlink transmission is received as well as a DCI format and a value of the DAI. Since only one downlink transmission is received, whether the HARQ-ACK corresponding to the one downlink transmission is only transmitted on the PUSCH is judged according to whether the downlink transmission is scheduled by the DCI format 1_0 in which the DAI value is equal to 1, and steps thereof are similar to those in way 1 or 2, the descriptions thereof are omitted herein.

Way 4: the HARQ-ACK is always transmitted on the PUSCH according to a semi-static codebook corresponding to slot n+1, that is, 5-bit HARQ-ACK is transmitted. NACK is generated on a position where no PDSCH is received.

It should be noted that the receiving of one or more received downlink transmissions means that a downlink transmission with corresponding HARQ-ACK to be transmitted on a PUSCH is received in a downlink transmission occasion set corresponding to a semi-static HARQ-ACK codebook.

In slot n+2, PDSCHs in slots n−4 and n−3 require HARQ-ACK feedback in slot n+2 according to the scheduling of the network device, and it is assumed that a PUCCH resource carrying the HARQ-ACK is superimposed with a PUSCH resource in slot n+2, since the terminal device does not support or is not configured with the simultaneous transmission for the PUCCH and the PUSCH, when a time condition of UCI multiplexing is met, the HARQ-ACK on the PUCCH is required to be transferred for transmission on the PUSCH, and the PUCCH is no longer transmitted. At the moment, whether the value of 1-bit DAI in the DCI format 0_1 scheduling the repetition transmission of the PUSCH is 0 is not taken into account, and the HARQ-ACK is determined according to the following ways.

Way 1: the HARQ-ACK is determined according to a determined method for HARQ-ACK transmission on a PUSCH without a corresponding PDCCH. That is, processing is performed according to a situation that no corresponding PDCCH schedules the PUSCH. Since more than one downlink transmission is received, it is determined that the HARQ-ACK is transmitted on the PUSCH according to a semi-static codebook corresponding to slot n+2, that is, 5-bit HARQ-ACK is transmitted. NACK is generated on a position where no PDSCH is received.

Way 2: the HARQ-ACK is determined according to a determined method for HARQ-ACK transmission on a PUCCH, and a configuration parameter for spatial bundling of the HARQ-ACK corresponding to the PUCCH is replaced with a configuration parameter for spatial bundling of the HARQ-ACK corresponding to the PUSCH. Spatial bundling is not involved in the first embodiment, and therefore, the HARQ-ACK is directly determined according to of the method of transmission on the PUCCH.

Since more than one downlink transmission is received, the HARQ-ACK is transmitted on the PUSCH according to a semi-static codebook corresponding to slot n+1, that is, 5-bit HARQ-ACK is transmitted. NACK is generated on a position where no PDSCH is received.

Way 3: the HARQ-ACK is determined according to a judgment whether only one downlink transmission is received as well as a DCI format and a value of the DAI. Since more than one downlink transmission is received, the HARQ-ACK is transmitted on the PUSCH according to a semi-static codebook corresponding to slot n+1, that is, 5-bit HARQ-ACK is transmitted. NACK is generated on a position where no PDSCH is received.

Way 4: the HARQ-ACK is always transmitted on the PUSCH according to a semi-static codebook corresponding to slot n+1, that is, 5-bit HARQ-ACK is transmitted. NACK is generated on a position where no PDSCH is received.

It should be noted that the receiving of one or more received downlink transmissions means that a downlink transmission with corresponding HARQ-ACK to be transmitted on a PUSCH is received in a downlink transmission occasion set corresponding to a semi-static HARQ-ACK codebook.

A way used in slot n+3 is similar to that in slot n+1 not to be described herein.

For the network device, the network device determines whether HARQ-ACK exists on a PUSCH and the bits of the HARQ-ACK in each slot according to the same way described as above, and furthermore, the HARQ-ACK is received on the PUSCH.

Known from the first embodiment, if the situation that the DAI in DCI format 0_1 (that is, UL grant) for scheduling the PUSCH is equal to 0 is taken into account in the slot of the repetition transmission of each PUSCH, it contradicts an actually existing downlink transmission requiring HARQ-ACK feedback in the slot, if the DAI in the UL grant is referred as 0, it means that HARQ-ACK transmission may not exist in each subsequent PUSCH which is performed repetition transmission, which will have a strong impact on downlink scheduling and throughput. The value of the DAI is not taken into account in the embodiment of the present application, HARQ-ACK feedback is directly performed according to an actual demand of the downlink transmission, and thus, the above-mentioned problem may be avoided.

In addition, if 1-bit DAI in the UL grant is indicated as 1, while slots in which no corresponding downlink transmissions are received exist in subsequent slots n+1, n+2 and n+3, redundant HARQ-ACK transmission will be caused on the PUSCHs in the slots in the case that the HARQ-ACK is always determined according a UL DAI in the UL grant, that is, the terminal device is required to generate NACK as a placeholder for transmission according to information indicated by the UL DAI, however, in fact, there is no corresponding downlink transmission, and thus, efficiencies of an uplink transmission and a system are reduced. The value of the DAI is not taken into account in the embodiment of the present application, HARQ-ACK feedback is directly performed according to an actual demand of the downlink transmission, and thus, the above-mentioned problem may be avoided.

Figure 3:
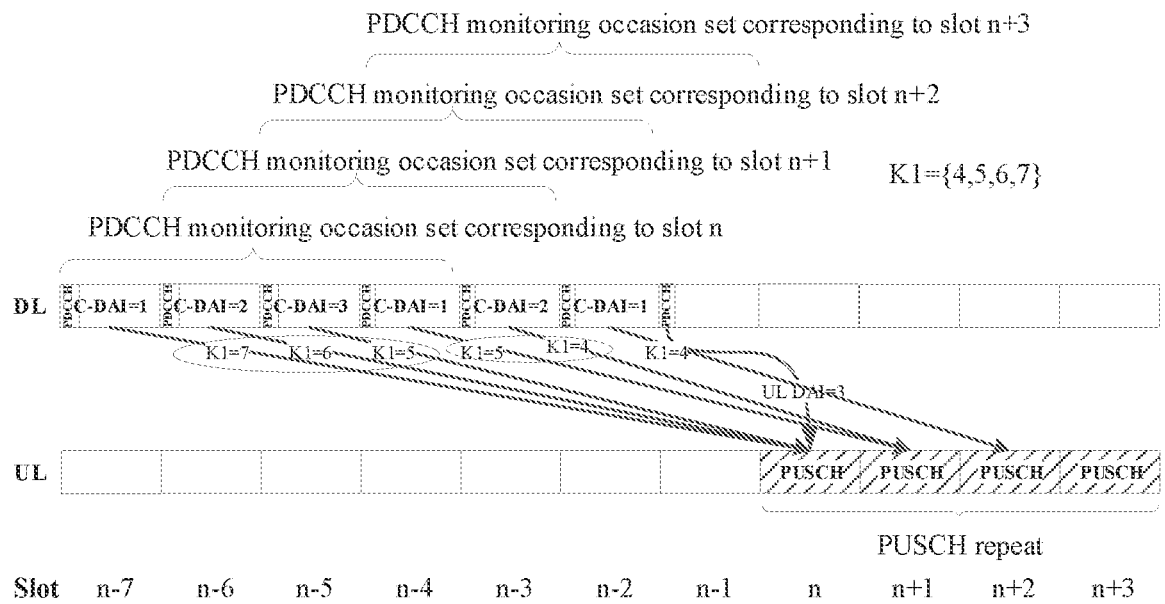
FIG. 3 is a schematic diagram showing scheduling and feedback in a second embodiment of the present application.

Second embodiment: referring to FIG. 3, FIG. 3 is a schematic diagram showing scheduling and feedback and is applied to the above-mentioned scenario. FIG. 3 is also described with an FDD (Frequency Division Duplex) system as an example. It is assumed that only one carrier is configured, a time sequence set K1 of HARQ-ACK feedback is equal to {4,5,6,7}, and K1 takes a slot as a device and is used for determining a slot, in which the transmission of a PUCCH carrying HARQ-ACK on a PDSCH is performed, according to a slot in which the transmission of the PDSCH is performed. It is assumed that at most one PDSCH is transmitted in each downlink slot, a dynamic HARQ-ACK codebook is configured to be used, then, a PDCCH monitoring occasion set corresponding to a dynamic codebook corresponding to each uplink slot as shown in FIG. 3 may be determined according to a set K1 and a candidate time domain resource set of the PDSCH (that is, information, including various time domain positions and K0 information, in a preconfigured resource table), K0=0 is assumed for simplicity in the present embodiment, the set includes 4 possible PDCCH monitoring positions, it is possible to receive a PDCCH on each of the PDCCH monitoring positions, furthermore, one time domain resource in the candidate time domain resource set of the PDSCH may be determined according to a PDSCH time domain resource indication domain carried in the PDCCH, and the one time domain resource includes a time domain position of the PDSCH and a slot in which the transmission of the PDSCH is performed (the slot is determined according to K0). Of course, all candidate PDSCH time domain resources in the candidate time domain resource set of the PDSCH may have the same or different K0 values. It is assumed that each PDSCH corresponds to 1-bit HARQ-ACK, the size of a dynamic codebook corresponding to one uplink slot may be determined according to a PDCCH received in a PDCCH monitoring occasion set corresponding to each uplink slot and used for scheduling the transmission of the PDSCH or a PDCCH used for indicating the release of a downlink SPS resource and a value of the DAI carried in the above-mentioned PDCCH. Specifically, for a single carrier situation, the above-mentioned PDCCH only includes 2-bit DAI and the DAI is accumulatively increased according to a time domain scheduling order, then, the quantity of PDSCHs corresponding to one uplink slot and PDCCHs indicating the release of an SPS source may be known according to a DAI in the last received PDCCH, and thus, the size of an HARQ-ACK Codebook in the uplink slot may be known. It is assumed that the network device transmits one PDCCH (UL grant) adopting the DCI format 0_1 in slot n−1 to schedule the terminal device to perform a repetition transmission of the PUSCH in slots n to n+3, that is, the PUSCH in each slot carries the same TB, and is configured with the same parameters such as a time-frequency domain resource and an MCS are used. It is assumed that 3 PDCCHs respectively scheduling 3 PDSCH transmissions requiring HARQ-ACK feedback in uplink slot n exist in a corresponding PDCCH monitoring occasion set (that is, slots n−7 to n−4) corresponding to uplink slot n, the network device sets 2-bit DAI in the DCI format 0_1, transmitted in slot n−1, for scheduling the PUSCH as 3 (according to different bits of UL DAI included in different UL grants of a codebook), which represents that there is HARQ-ACK feedback corresponding to the three PDSCHs on the PUSCH. It is assumed that the terminal device does not support or is not configured with the simultaneous transmission for the PUCCH and the PUSCH, the HARQ-ACK is determined according to the following ways.

In slot n, the terminal device receives 3 downlink transmissions requiring HARQ-ACK feedback in slot n, a DL DAI (that is, a DAI for scheduling a PDCCH in the downlink transmission) in the last downlink transmission is indicated as 3. It is assumed that a PUCCH resource carrying the HARQ-ACK is superimposed with a PUSCH resource in slot n+1, since the terminal device does not support or is not configured with the simultaneous transmission for the PUCCH and the PUSCH, the HARQ-ACK on the PUCCH is required to be transferred for transmission on the PUSCH, and the PUCCH is no longer transmitted. Moreover, a DAI in a PDCCH in an uplink transmission is scheduled as 3 by the terminal device according to 2-bit UL DAI in the DCI format 0_1 for scheduling the PUSCH and is identical to the quantity of received actually downlink transmission, and then, it is determined that 3-bit HARQ-ACK is transmitted on the PUSCH according to the UL DAI (it is assumed that each PDSCH corresponds to 1-bit HARQ-ACK, of course, in other embodiments, each PDSCH may further corresponds to multi-bit HARQ-ACK according to a transmission configuration of the PDSCH). Particularly, if the terminal device loses the PDCCH in slot n−5, it is determined that there are only two downlink transmissions according to the DL DAI in the last received downlink transmission (in slot n−6), at the moment, the UL DAI is indicated as 3, then, it may be determined that one downlink transmission is lost, and 3 downlink transmissions are required for HARQ-ACK feedback on the PUSCH according to the UL DAI, that is, 3-bit HARQ-ACK is still transmitted on the PUSCH. For the last bit, NACK is generated as HARQ-ACK for determining the downlink transmission with packet loss.

In slot n+1, PDSCHs in slots n−4 and n−3 require HARQ-ACK feedback in slot n+1 according to the scheduling of the network device, and it is determined that there are only 2 downlink transmissions requiring HARQ-ACK feedback in slot n+1 according to a DL DAI (which is equal to 2) in the last received PDCCH. It is assumed that a PUCCH resource carrying the HARQ-ACK is superimposed with a PUSCH resource in slot n+1, since the terminal device does not support or is not configured with the simultaneous transmission for the PUCCH and the PUSCH, the terminal device is required to transfer the HARQ-ACK on the PUCCH to the PUSCH for transmission, and the PUCCH is no longer transmitted. At the moment, the value of 2-bit DAI in the DCI format 0_1 scheduling the repetition transmission of the PUSCH is not taken into account, and several ways for determining the HARQ-ACK are further provided as follows.

Way 1: the HARQ-ACK is determined according to a determined method for HARQ-ACK transmission on a PUSCH without a corresponding PDCCH. That is, processing is performed according to a situation that no corresponding PDCCH schedules the PUSCH, that is, the bits of the HARQ-ACK required to be transmitted on the PUSCH in slot n+1 is directly determined according to the quantity of downlink transmissions indicated by the DL DAI in the last received PDCCH in the PDCCH monitoring occasion set corresponding to slot n+1, that is, at the moment, 2-bit HARQ-ACK is generated.

Way 2: the HARQ-ACK is determined according to a determined method for HARQ-ACK transmission on a PUCCH, and a configuration parameter for spatial bundling of the HARQ-ACK corresponding to the PUCCH is replaced with a configuration parameter for spatial bundling of the HARQ-ACK corresponding to the PUSCH. Spatial bundling is not involved in the second embodiment, and therefore, the terminal device may directly determine the bits of the HARQ-ACK required to be transmitted on the PUSCH in slot n+1 according to the quantity of the downlink transmissions indicated by the DL DAI in the last received PDCCH in the PDCCH monitoring occasion set corresponding to slot n+1, that is, at the moment, 2-bit HARQ-ACK is generated.

Way 3: a codebook is always determined according to a DAI in a PDCCH using a downlink DCI format; that is, the bits of the HARQ-ACK required to be transmitted on the PUSCH in slot n+1 is directly determined according to the quantity of the downlink transmissions indicated by the DL DAI in the last received PDCCH in the PDCCH monitoring occasion set corresponding to slot n+1, that is, at the moment, 2-bit HARQ-ACK is generated.

In slot n+2, a PDSCH in slot n−2 requiring HARQ-ACK feedback in slot n+2 according to the scheduling of the network device. It is assumed that a PUCCH resource carrying the HARQ-ACK is superimposed with a PUSCH resource in slot n+2, since the terminal device does not support or is not configured with the simultaneous transmission for the PUCCH and the PUSCH, the terminal device is required to transfer the HARQ-ACK on the PUCCH to the PUSCH for transmission, and the PUCCH is no longer transmitted. At the moment, the value of 2-bit DAI in the DCI format 0_1 scheduling the repetition transmission of the PUSCH is not taken into account, and several ways for determining the HARQ-ACK are further provided as follows.

Way 1: the HARQ-ACK is determined according to a determined method for HARQ-ACK transmission on a PUSCH without a corresponding PDCCH. That is, processing is performed according to a situation that no corresponding PDCCH schedules the PUSCH, that is, the bits of the HARQ-ACK required to be transmitted on the PUSCH in slot n+2 is directly determined according to the quantity of downlink transmissions indicated by the DL DAI in the last received PDCCH in the PDCCH monitoring occasion set corresponding to slot n+2, that is, at the moment, 1-bit HARQ-ACK is generated.

Way 2: the HARQ-ACK is determined according to a determined method for HARQ-ACK transmission on a PUCCH, and a configuration parameter for spatial bundling of the HARQ-ACK corresponding to the PUCCH is replaced with a configuration parameter for spatial bundling of the HARQ-ACK corresponding to the PUSCH. Spatial bundling is not involved in the second embodiment, and therefore, the terminal device may directly determine the bits of the HARQ-ACK required to be transmitted on the PUSCH in slot n+2 according to the quantity of the downlink transmissions indicated by the DL DAI in the last received PDCCH in the PDCCH monitoring occasion set corresponding to slot n+2, that is, at the moment, 1-bit HARQ-ACK is generated.

Way 3: a codebook is always determined according to a DAI in a PDCCH using a downlink DCI format; that is, the HARQ-ACK is determined according to a way of transmission on the PUCCH, that is, the bits of the HARQ-ACK required to be transmitted on the PUSCH in slot n+2 is determined according to the quantity of the downlink transmissions indicated by the DL DAI in the last received PDCCH in the PDCCH monitoring occasion set corresponding to slot n+2, that is, at the moment, 1-bit HARQ-ACK is generated.

Fourth situation: if no downlink transmission requiring HARQ-ACK feedback is received in slot n+3, the superimposed transmission of the PUCCH and the PUSCH does not exist, the value of 2-bit DAI in DCI format 0_1 scheduling the repetition transmission of the PUSCH is not taken into account, and no HARQ-ACK is transmitted on the PUSCH. At the moment, it is determined that no HARQ-ACK is transmitted on the PUSCH no matter which way in way 1, way 2 and way 3 described as above is adopted.

For a network device, the network device determines whether HARQ-ACK exists on a PUSCH and the bits of the HARQ-ACK in each slot according to the same way described as above, and furthermore, the HARQ-ACK is received on the PUSCH.

It should be noted that, in the above-mentioned second embodiment, the receiving of one or more downlink transmissions means that PDCCHs scheduling the downlink transmissions are received in a PDCCH monitoring occasion set (the PDCCH monitoring occasion set is determined according to a set K1 and a set K0 in a candidate time domain resource set of the PDSCH, for example, slot n is used as an example, PDSCH transmission occasions may be determined as n−K1, that is , slots n−7 to n−4 according to the set K1, it is assumed that the only value of K0 is 0, PDCCHs scheduling the transmission of these PDSCH transmission occasions are further determined as n−Kl-KO, that is, slots n−7 to n−4, based on the PDSCH transmission occasions, as shown in FIG. 3, if there are other values for K0, the determined PDCCH monitoring occasion set may be greater, for example, K0={0,1}, then, PDCCH monitoring occasions further determined based on the PDSCH transmission occasions in slots n−7 to n−4 are slots n−8 to n−4) corresponding to a dynamic HARQ-ACK codebook, and these downlink transmissions are determined to require HARQ-ACK feedback in a slot in which the PUSCH is located according to K1 corresponding to these downlink transmissions, that is, these downlink transmissions require the transmission of the HARQ-ACK on the PUSCH.

Known from the second embodiment, if 2-bit DAI (which is equal to 3) in DCI format 0_1 scheduling the PUSCH are taken into account on the PUSCH in slots n+1, n+2 and n+3 of subsequent repetition transmissions, 3-bit HARQ-ACK is always required to be transmitted, however, in fact, it is actually inconsistent with HARQ-ACK feedback in the slot required by an actually existing downlink transmission. If the DAI in the DCI format 0_1 scheduling the PUSCH is 3, it means that redundant bits of HARQ-ACK more than an actual downlink demand are required to be generated for transmission in each PUSCH in the subsequent repetition transmissions, so that efficiencies of an uplink transmission and a system will be reduced, and the overhead of the uplink transmission is also increased. The value of the DAI is not taken into account in the embodiment of the present application, HARQ-ACK feedback is directly performed according to an actual demand of the downlink transmission, and thus, the above-mentioned problem may be avoided.

In addition, in the second embodiment, if 2-bit DAI in the UL grant indicates a relatively small value such as 1, the quantity of the downlink transmissions indicated by the UL grant is smaller than the quantity of the actually received downlink transmissions in slots n+1 and n+2, if the HARQ-ACK is determined according to 2-bit UL DAI in the UL grant, HARQ-ACK feedback will not exist in parts of downlink transmissions, and thus, the downlink throughput and the efficiency of the system will be affected. The value of the DAI is not taken into account in the embodiment of the present application, HARQ-ACK feedback is directly performed according to an actual demand of the downlink transmission, and thus, the above-mentioned problem may be avoided.

It should be noted that, in the above-mentioned first and second embodiments, K1 is exampled as a value dynamically indicated by an indication domain in a PDCCH corresponding to a downlink transmission. Besides, K1 may also be predefined or preconfigured by a high-level signaling, at the moment, each downlink transmission is only provided with a fixed feedback time sequence, however, the change of the definition of the time sequence has no impact on the execution of the above-mentioned solution. In the above-mentioned first and second embodiments, the downlink transmissions are described only with PDSCHs as examples, it is also applicable if one or all of the PDSCHs are replaced with PDCCHs indicating the release of a downlink SPS resource, at the moment, the PDCCHs corresponding to the downlink transmissions are the PDCCHs indicating the release of the downlink SPS resource. FDD is described as an example in the above-mentioned first and second embodiments, and it is also applicable to these embodiments if it is TDD, the only difference lies in that a candidate set, determined by a semi-static codebook, of the PDSCH is not necessarily located in continuous slots, it is further possible that a PDCCH monitoring occasion set determined by a dynamic codebook is not located in the continuous slots, and it is possible that some slots are removed because downlink transmission resources do not exist in these slots, or the downlink transmission resources may not support the size of the candidate time domain resource of the PDSCH. Single carrier is only described as an example in the above-mentioned first and second embodiments, multi-carriers are also applicable. For the first embodiment, when a semi-static codebook is used, a codebook is determined for each carrier, and then, the codebooks are cascaded together to obtain a final codebook. For the second embodiment, when a dynamic codebook is used, PDCCH monitoring occasion sets on all the carriers are determined based on a candidate time domain resource (including K0) of the PDSCH on each carrier and a set K1, a PDCCH scheduling a downlink transmission includes 4-bit DAI, with 2-bit C-DAI indicating the accumulative scheduling counts of downlink transmissions in a frequency domain first and then a time domain and 2-bit T-DAI indicating the total quantity of the downlink transmissions accumulatively scheduled at the current moment, and thus, the dynamic codebook corresponding to the multi-carriers may be finally obtained according to the C-DAI and the T-DAI. If sub-codebooks (respective codebooks for a downlink transmission based on a TB and a downlink transmission based on CBG) are adopted, a PDCCH scheduling a PUSCH includes 4-bit UL DAI, with 2-bit UL DAI corresponding to sub-codebooks based on the TB and 2-bit UL DAI corresponding to sub-codebooks based on the CBG, which respectively indicate the total quantity of the downlink transmissions in the corresponding sub-codebooks, at the moment, the above-mentioned way for generating the HARQ-ACK transmitted on the PUSCH is also applicable. In the above-mentioned first and second embodiments, when one UL grant simultaneously schedules the transmission of 4 PUSCHs in slot n to n+3 and independent TBs are respectively transmitted on the 4 PUSCHs (that is, rather than the repetition transmission of the same TB), for example, the 4 PUSCHs correspond to the same scheduling information, but are carried on different TBs, or the DCI used in the one UL grant includes a plurality of independent indication domains respectively corresponding to each of 4 slots, scheduling information in the 4 slots may be different, and the above-mentioned method is also applicable.

It should be noted that the HARQ-ACK transmission method provided by the embodiment of the present application is also suitable for the situation that the same PDCCH performs combined scheduling on the transmission of N independent PUSCHs. For example, if a PUCCH carrying the HARQ-ACK is superimposed with a first PUSCH, the HARQ-ACK carried on the PUSCH is determined according to a DAI in a DCI format used for the PDCCH; and if a PUCCH carrying the HARQ-ACK is superimposed with the PUSCHs in addition to the first PUSCH, a DAI in a DCI format used for the PDCCH is ignored, and the HARQ-ACK carried on the PUSCH is determined according to a way of transmitting the HARQ-ACK on the PUCCH.

Based on the above, in the embodiment of the present application, if the PUCCH carrying the HARQ-ACK is superimposed with the plurality of PUSCHs in addition to the first PUSCH, the terminal device may ignore the DAI in the DCI format used for the PDCCH and determine the HARQ-ACK carried on the plurality of PUSCHs. That is, a new mechanism is provided, and how to transmit HARQ-ACK on a PUSCH configured with repetition transmission or a plurality of PUSCHs scheduled by the same PDCCH is specified.

Devices provided by the embodiments of the present application will be introduced below in combination with the accompanying drawings of the specification.

Figure 4:
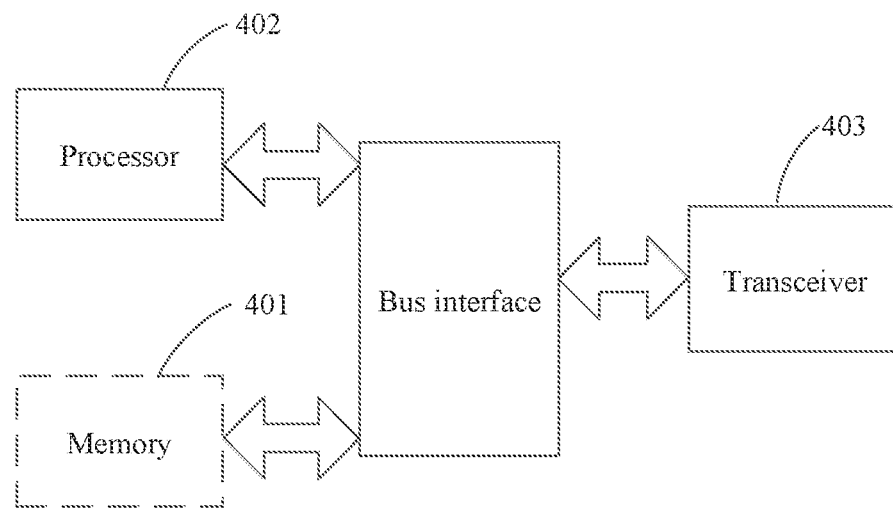
FIG. 4 is a schematic diagram showing a structure of a terminal device provided in an embodiment of the present application.

Referring to FIG. 4, based on the same inventive concept, an embodiment of the present application provides a terminal device. The terminal device includes a memory 401, a processor 402 and a transceiver 403, and the memory 401 and the transceiver 403 may be connected with the processor 402 by a bus interface (which is used as an example in FIG. 4), or connected with the processor 402 by a connecting wire.

The memory 401 may be configured to store a program. The transceiver 403 is configured to transmit or receive data under the control of the processor. The processor 402 may be configured to read the program in the memory 401 and execute the following processes: if HARQ-ACK is transmitted on at least one of a plurality of PUSCHs corresponding to one PDCCH in addition to a first PUSCH of the plurality of PUSCHs, ignoring a DAI in a DCI format used for the PDCCH when the HARQ-ACK is determined; and transmitting the determined HARQ-ACK on the at least one PUSCH.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the processor 402 is specifically configured to determine the HARQ-ACK according to a determined method for HARQ-ACK transmission on a PUSCH without a corresponding PDCCH; or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the processor 402 is specifically configured to: in the condition that a semi-static HARQ-ACK codebook is used, if no downlink transmission or semi-persistent scheduling (SPS) PDSCH with corresponding HARQ-ACK to be transmitted on a PUSCH is received, determine no transmission of HARQ-ACK on the PUSCH; and/or, if only one downlink transmission with corresponding HARQ-ACK to be transmitted on a PUSCH is received and is scheduled by a PDCCH using a DCI format 1_0, and a DAI in the DCI format 1_0 is equal to 1, or, if only one SPS PDSCH with corresponding HARQ-ACK to be transmitted on a PUSCH is received, determine that the HARQ-ACK is HARQ-ACK corresponding to the downlink transmission or the SPS PDSCH; otherwise, determine that the HARQ-ACK is a semi-static HARQ-ACK codebook determined according to a candidate time domain resource set for a downlink transmission and a feedback timing set between a downlink transmission and an HARQ-ACK.

In one embodiment, the processor 402 is specifically configured to: in the condition that a semi-static HARQ-ACK codebook is used, if no downlink transmission or SPS PDSCH with corresponding HARQ-ACK to be transmitted on a PUSCH is received, determine no transmission of HARQ-ACK on the PUSCH; and/or, if at least one downlink transmission with corresponding HARQ-ACK to be transmitted on a PUSCH is received, determine that the HARQ-ACK is a semi-static HARQ-ACK codebook determined according to a candidate time domain resource set for a downlink transmission and a feedback timing set between a downlink transmission and an HARQ-ACK, or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the processor 402 is specifically configured to: in the condition that a dynamic HARQ-ACK codebook is used, if no downlink transmission or SPS PDSCH with corresponding HARQ-ACK to be transmitted on a PUSCH is received, determine no transmission of HARQ-ACK on the PUSCH; and/or, if at least one downlink transmission or SPS PDSCH with corresponding HARQ-ACK to be transmitted on a PUSCH is received, determine that the HARQ-ACK is a dynamic HARQ-ACK codebook determined according to a DAI in a PDCCH corresponding to the downlink transmission.

In one embodiment, the downlink transmission is at least one of SPS PDSCH release or PDSCH.

In FIG. 4, a bus architecture may include any quantity of interconnected buses and bridges, and specifically links various circuits of one or more processors represented by the processor 402 and a memory represented by the memory 401 together. The bus architecture may further link various other circuits such as a peripheral device, a voltage stabilizer and a power management circuit which are publically known in the field not to be further described herein. A bus interface is provided with an interface. The transceiver 403 may include a plurality of elements, that is, a transmitter and a transceiver for providing devices communicating with various other apparatuses on a transmission medium. The processor 402 takes charge of managing the bus architecture and usual processing, and the memory 401 is to store data used when the processor 402 executes operation.

In one embodiment, the memory 401 may include an ROM (Read Only Memory), an RAM (Random Access Memory) and a magnetic disk memory. The memory 401 is configured to store data required when the processor 402 operates, that is, an instruction which may be executed by at least one processor 402, the at least one processor 402 executes the instruction stored by the memory 401, and thus, the HARQ-ACK transmission method provided by the embodiments as shown in FIG. 1 to FIG. 3 is executed. One or more memories 401 are provided, and the memories 401 are concurrently shown in FIG. 4, however, it should be known that the memories 401 are optional functional devices to be shown with dotted lines in FIG. 4.

Figure 5:
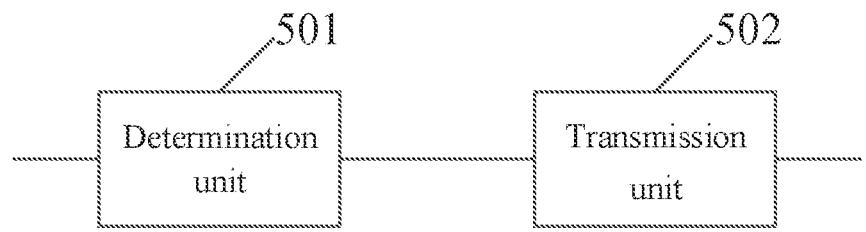
FIG. 5 is a schematic diagram showing a structure of a terminal device provided in an embodiment of the present application.

Referring to FIG. 5, based on the same inventive concept, an embodiment of the present application provides a terminal device. The terminal device may include a determination device 501 and a transmission device 502. The determination device 501 may be configured to: if HARQ-ACK is transmitted on at least one of a plurality of PUSCHs corresponding to one PDCCH in addition to a first PUSCH of the plurality of PUSCHs, ignore a DAI in a DCI format used for the PDCCH when the HARQ-ACK is determined. The transmission device 502 is configured to transmit the determined HARQ-ACK on the at least one PUSCH.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the determination device 501 is specifically configured to: determine the HARQ-ACK according to a determined method for HARQ-ACK transmission on a PUSCH without a corresponding PDCCH; or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the determination device 501 is specifically configured to: in the condition that a semi-static HARQ-ACK codebook is used, if no downlink transmission or semi-persistent scheduling (SPS) PDSCH with corresponding HARQ-ACK to be transmitted on a PUSCH is received, determine no transmission of HARQ-ACK on the PUSCH; and/or, if only one downlink transmission with corresponding HARQ-ACK to be transmitted on a PUSCH is received and is scheduled by a PDCCH using a DCI format 1_0, and a DAI in the DCI format 1_0 is equal to 1, or, if only one SPS PDSCH with corresponding HARQ-ACK to be transmitted on a PUSCH is received, determine that the HARQ-ACK is HARQ-ACK corresponding to the downlink transmission or the SPS PDSCH; otherwise, determine that the HARQ-ACK is a semi-static HARQ-ACK codebook determined according to a candidate time domain resource set for a downlink transmission and a feedback timing set between a downlink transmission and an HARQ-ACK.

In one embodiment, the determination device 501 is specifically configured to: in the condition that a semi-static HARQ-ACK codebook is used, if no downlink transmission or SPS PDSCH with corresponding HARQ-ACK to be transmitted on a PUSCH is received, determine no transmission of HARQ-ACK on the PUSCH; and/or, if at least one downlink transmission with corresponding HARQ-ACK to be transmitted on a PUSCH is received, determine that the HARQ-ACK is a semi-static HARQ-ACK codebook determined according to a candidate time domain resource set for a downlink transmission and a feedback timing set between a downlink transmission and an HARQ-ACK, or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the determination device 501 is specifically configured to: in the condition that a dynamic HARQ-ACK codebook is used, if no downlink transmission or SPS PDSCH with corresponding HARQ-ACK to be transmitted on a PUSCH is received, determine no transmission of HARQ-ACK on the PUSCH; and/or, if at least one downlink transmission or SPS PDSCH with corresponding HARQ-ACK to be transmitted on a PUSCH is received, determine that the HARQ-ACK is a dynamic HARQ-ACK codebook determined according to a DAI in a PDCCH corresponding to the downlink transmission.

In one embodiment, the downlink transmission is at least one of SPS PDSCH release or PDSCH.

Entity devices corresponding to the determination device 501 and the transmission device 502 may be the aforementioned processor 402 or transceiver 403. The base station may be used for executing the HARQ-ACK transmission method provided by the embodiments as shown in FIG. 1 to FIG. 3. Therefore, functions which may be achieved by various functional devices in the device may refer to corresponding descriptions in the embodiments as shown in FIG. 1 to FIG. 3, the descriptions thereof are omitted herein.

Figure 6:
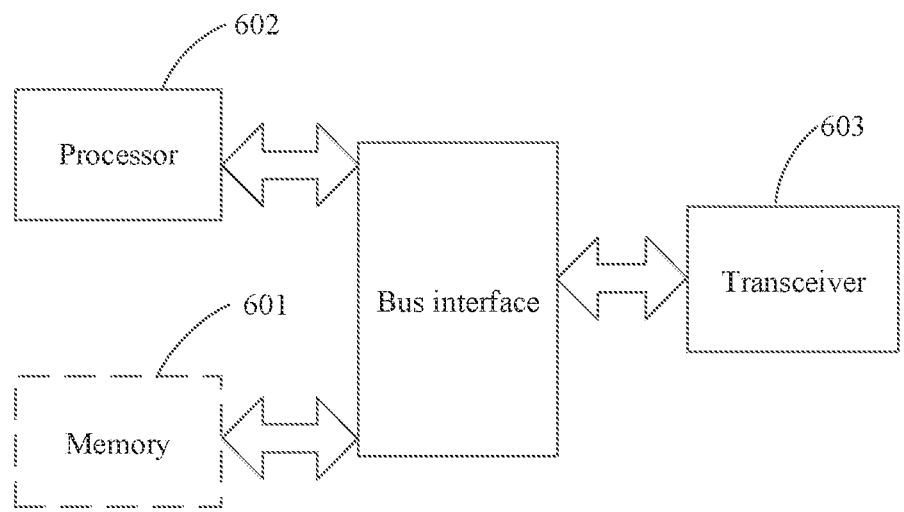
FIG. 6 is a schematic diagram showing a structure of a network device provided in an embodiment of the present application.

Referring to FIG. 6, based on the same inventive concept, an embodiment of the present application provides a network device. The network device includes a memory 601, a processor 602 and a transceiver 603. The memory 601 and the transceiver 603 may be connected with the processor 602 by a bus interface (which is used as an example in FIG. 6), or connected with the processor 602 by a connecting wire.

The memory 601 may be configured to store a program. The transceiver 603 is configured to transmit or receive data under the control of the processor. The processor 602 may be configured to read the program in the memory 601 and execute the following processes: if HARQ-ACK is transmitted on at least one of a plurality of PUSCHs corresponding to one PDCCH in addition to a first PUSCH of the plurality of PUSCHs, ignore a DAI in a DCI format used for the PDCCH when the quantity of feedback bits of the HARQ-ACK is determined; and receive the HARQ-ACK on the at least one PUSCH according to the quantity of the feedback bits of the HARQ-ACK.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the processor 602 is specifically configured to: determine the quantity of the feedback bits of the HARQ-ACK according to a determined method for HARQ-ACK transmission on a PUSCH without a corresponding PDCCH; or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the processor 602 is specifically configured to: in the condition that a semi-static HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if only one downlink transmission with corresponding HARQ-ACK to be transmitted on a PUSCH is transmitted and is scheduled by a PDCCH using a DCI format 1_0, and a DAI in the DCI format 1_0 is equal to 1, or, if only one SPS PDSCH with corresponding HARQ-ACK to be transmitted on a PUSCH is transmitted, determine that the quantity of the feedback bits of the HARQ-ACK is the quantity of feedback bits of the HARQ-ACK corresponding to the downlink transmission or the SPS PDSCH; otherwise, determine that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK.

In one embodiment, the processor 602 is specifically configured to: in the condition that a semi-static HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if at least one downlink transmission with corresponding HARQ-ACK to be transmitted on a PUSCH is transmitted, determine that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK, or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the processor 602 is specifically configured to: in the condition that a dynamic HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if at least one downlink transmission with corresponding HARQ-ACK to be transmitted on a PUSCH is transmitted, determine that the quantity of feedback bits of the HARQ-ACK is the quantity of feedback bits of a dynamic HARQ-ACK codebook determined according to a DAI in a PDCCH corresponding to the downlink transmission.

In one embodiment, the downlink transmission is at least one of: SPS PDSCH release or PDSCH.

In FIG. 6, a bus architecture may include any quantity of interconnected buses and bridges, and specifically links various circuits of one or more processors represented by the processor 602 and a memory represented by the memory 601 together. The bus architecture may further link various other circuits such as a peripheral device, a voltage stabilizer and a power management circuit which are publically known in the field not to be further described herein. A bus interface is provided with an interface. The transceiver 603 may include a plurality of elements, that is, a transmitter and a transceiver for providing devices communicating with various other apparatuses on a transmission medium. The processor 602 takes charge of managing the bus architecture and usual processing, and the memory 601 is to store data used when the processor 602 executes operation.

In one embodiment, the memory 601 may include an ROM (Read Only Memory), an RAM (Random Access Memory) and a magnetic disk memory. The memory 601 is configured to store data required when the processor 602 operates, that is, an instruction which may be executed by at least one processor 602, the at least one processor 602 executes the instruction stored by the memory 601, and thus, the HARQ-ACK transmission method provided by the embodiments as shown in FIG. 1 to FIG. 3 is executed. One or more memories 601 are provided, and the memories 601 are concurrently shown in FIG. 6, however, it should be known that the memories 601 are optional functional devices to be shown with dotted lines in FIG. 6.

Figure 7:
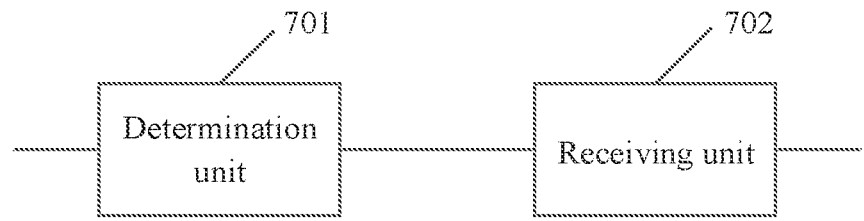
FIG. 7 is a schematic diagram showing a structure of a network device provided in an embodiment of the present application.

Referring to FIG. 7, based on the same inventive concept, an embodiment of the present application provides a network device. The network device includes a determination device 701 and a receiving device 702. The determination device 701 may be configured to: if HARQ-ACK is transmitted on at least one of a plurality of PUSCHs corresponding to one PDCCH in addition to a first PUSCH of the plurality of PUSCHs, ignore a DAI in a DCI format used for the PDCCH when the quantity of feedback bits of the HARQ-ACK is determined. The receiving device 702 is configured to receive the HARQ-ACK on the at least one PUSCH according to the quantity of the feedback bits of the HARQ-ACK.

In one embodiment, the plurality of PUSCHs are repetition transmission of the same PUSCH or TB; or, the plurality of PUSCHs are transmissions of a plurality of independent PUSCHs scheduled by the same PDCCH.

In one embodiment, the DCI format is DCI format 0_1.

In one embodiment, the determination device 701 is specifically configured to: determine the quantity of the feedback bits of the HARQ-ACK according to a determined method for HARQ-ACK transmission on a PUSCH without a corresponding PDCCH; or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the determination device 701 is specifically configured to: in the condition that a semi-static HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if only one downlink transmission with corresponding HARQ-ACK to be transmitted on a PUSCH is transmitted and is scheduled by a PDCCH using a DCI format 1_0, and a DAI in the DCI format 1_0 is equal to 1, or, if only one SPS PDSCH with corresponding HARQ-ACK to be transmitted on a PUSCH is transmitted, determine that the quantity of the feedback bits of the HARQ-ACK is the quantity of feedback bits of the HARQ-ACK corresponding to the downlink transmission or the SPS PDSCH; otherwise, determine that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK.

In one embodiment, the determination device 701 is specifically configured to: in the condition that a semi-static HARQ-ACK codebook is used, if no downlink transmission or SPS PDSCH with corresponding HARQ-ACK to be transmitted on a PUSCH is transmitted, determine no reception of HARQ-ACK on the PUSCH; and/or, if at least one downlink transmission with corresponding HARQ-ACK to be transmitted on a PUSCH is transmitted, determine that the quantity of the feedback bits of the HARQ-ACK is the quantity of feedback bits of a semi-static HARQ-ACK codebook determined according to a candidate time domain resource set for a downlink transmission and a feedback timing set between a downlink transmission and an HARQ-ACK, or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, and the configuration parameter is used for indicating whether the spatial bundling is used for the HARQ-ACK.

In one embodiment, the determination device 701 is specifically configured to: in the condition that a dynamic HARQ-ACK codebook is used, if no downlink transmission or SPS PDSCH that HARQ-ACK on a PUSCH is transmitted, determine no reception of HARQ-ACK on PUSCH; and/or, if at least one downlink transmission with corresponding HARQ-ACK to be transmitted on a PUSCH is transmitted, determine that the quantity of feedback bits of the HARQ-ACK is the quantity of feedback bits of a dynamic HARQ-ACK codebook determined according to a DAI in a PDCCH corresponding to the downlink transmission.

In one embodiment, the downlink transmission is at least one of SPS PDSCH release or PDSCH.

Entity devices corresponding to the determination device 701 and the receiving device 702 may be the aforementioned processor 602 or transceiver 603. The base station may be used for executing a serving cell setting method provided by an embodiment as shown in FIG. 1. Therefore, functions which may be achieved by various functional devices in the device may refer to corresponding descriptions in the embodiments as shown in FIG. 1 to FIG. 3, the descriptions thereof are omitted herein.

Based on the same inventive concept, an embodiment of the present application further provides a computer storage medium, and the computer storage medium stores a computer instruction, and the HARQ-ACK transmission method provided by the embodiment as shown in FIG. 1 is executed when the computer program operates on a computer.

The HARQ-ACK transmission method, the terminal device and the network device provided by the embodiments of the present application may be applied to a wireless communication system such as a 5G system. However, an applicable communication system includes, but is not limited to the 5G system or a system evolved from the 5G system and other systems such as a system based on OFDM (orthogonal frequency division multiplexing), a system based on DFT-S-OFDM (DFT-Spread OFDM), an eLTE (Evolved Long Term Evolution) system and a novel network device system. In an actual application, the connection among all of the above-mentioned devices may be wireless or wired connection.

It should be noted that the above-mentioned communication system may include a plurality of terminal devices, and a network device may communicate with a plurality of terminal devices (signaling or data transmission). The terminal device involved in the embodiment of the present application may be a device for providing voice and/or data connectivity for a user, a handheld device with a wireless connection function or other processing devices connected to a wireless modem. A wireless user device may communicate with one or more core networks by an RAN (Radio Access Network), the terminal device may be a mobile terminal such as a mobile phone (or called cellular phone) and a computer with a mobile terminal, such as a portable mobile apparatus, a pocket-size mobile apparatus, a handheld mobile apparatus, a computer built-in mobile apparatus or a vehicle-mounted mobile apparatus, and they exchange languages and/or data with a radio access network. For example, the terminal device may be a device such as a PCS (Personal Communication Service) telephone, a cordless telephone, an SIP telephone, a WLL (Wireless Local Loop) station and a PDA (Personal Digital Assistant). A terminal may be further called a system, a subscriber device, a subscriber station, a mobile station, a mobile, a remote station, an access point, a remote terminal, an access terminal, a user terminal, a user agent, a user device and a wireless device.

The network device provided by the embodiment of the present application may be a base station or a router used for mutual conversion between a received air frame and an IP packet and located between a wireless terminal device and the rest part of an access network, and the rest part of the access network may include an IP (Internet Protocol) network device. The network device may be further a device for coordinating the attribute management of an air interface. For example, the network device may be a network device in the 5G system, such as a gNB (Next generation Node B), or a BTS (Base Transceiver Station) in a GSM (Global System for Mobile Communication) or a CDMA (Code Division Multiple Access), or a base station (NodeB) in a WCDMA (Wideband Code Division Multiple Access), or an eNB or e-NodeB (evolutional Node B) in an LTE, but is not limited in the embodiment of the present application.

It should be understood that words such as "first" and "second" in the descriptions of the embodiments of the present application are for descriptive purposes only, and cannot be understood as indicating or implying the relative importance or indicating or implying an order. In the descriptions of the embodiments of the present application, the meaning of "a plurality of" may be two or more.

In some possible implementation ways, various aspects of the HARQ-ACK transmission method, the network device and the terminal device provided by the embodiments of the present application may be further implemented in a form of a program product including a program code. When the program product operates on a computer device, the program code is configured to make the computer device to perform steps in a selection method for configuration information according to various exemplary implementation ways in the present application in the above-mentioned description of the present specification. For example, the computer device may execute the HARQ-ACK transmission method provided by the embodiment as shown in FIG. 1.

The program product may adopt one or any combination of more readable media. The readable medium may be a readable signal medium or a readable storage medium. The readable storage medium, for example, may be, but is not limited to an electric, magnetic, optical, electromagnetic, infrared or semiconductor system, apparatus or device and any combination thereof. A more example (a non-exhaustive list) of the readable storage medium includes an electric connector with one or more conducting wires, a portable disk, a hard disk, a random access memory (RAM), a read-only memory (ROM), an erasable programmable read-only memory (EPROM) or flash memory, an optical fiber, a compact disk read-only memory (CD-ROM), an optical storage device, a magnetic storage device or any appropriate combination thereof The program product for the HARQ-ACK transmission method in the implementation way of the present application may adopt a compact disk read-only memory (CD-ROM) and include a program code and may operate on a computer device. However, the program product in the present application is not limited to the CD-ROM, and in the present document, the readable storage medium may be any tangible medium including or storing a program which may be used by an instruction execution system, apparatus or device or a combination thereof The readable signal medium may include a data signal propagated in a base band or as a part of a carrier and carries a readable program code. The propagated data signal may adopt various forms which include, but are not limited to an electromagnetic signal, an optical signal or any appropriate combination thereof. The readable signal medium may also be any readable medium in addition to the readable storage medium, and the readable medium may transmit, propagate or transmit a program used by the instruction execution system, apparatus or device or the combination thereof The program code included by the readable medium may be transmitted by any appropriate medium including, but not limited to a wireless medium, a wired medium, an optical cable and an RF or any appropriate combination thereof.

The program code for executing the operation of the present application may be compiled by one or any combination of more programming languages including an object-oriented programming language such as Java and C++ and further including a conventional procedural programming language such as the C programming language or similar programming languages. The program code may be completely executed on a user computing device, partially executed on a user device, executed as an independent software package, partially executed on the user computing device and partially executed on a remote computing device or completely executed on the remote computing device or a server. In a situation in which the remote computing device is involved, the remote computing device may be connected to the user computing device by any kind of network including a local area network (LAN) or a wide area network (WAN), or connected to an external computing device (for example, connected by an interne service provider by virtue of the Internet).

It should be noted that although several devices or sub-devices of the apparatus are mentioned in the above detailed description, such division is only exemplary, but is not compulsory. Actually, features and functions of two or more of the devices described hereinabove may be concretized in one of the devices according to the implementation way of the present application. Conversely, features and functions of one of the devices described hereinabove may be further divided to be concretized by more of the devices.

In addition, although operations of the method provided by the present application are described in a order in the accompanying drawings, however, it is not required or implied that these operations have to be executed according to the order, or a desired result may be achieved by only executing all the shown operations. Additionally or alternatively, some steps may be omitted, a plurality of the steps are combined into one step to be executed, and/or one step is divided into a plurality of steps to be executed.

The embodiments of the present application may provide a method, system or computer program product. Therefore, forms of a complete hardware embodiment, a complete software embodiment or a software and hardware aspect combined embodiment may be adopted in the present application. In addition, a form of the computer program product executed on one or more computer available storage media (including, but not limited to a magnetic disk memory, a CD-ROM, an optical memory and the like) including a computer available program code may be adopted in the present application.

deviceEmbodiments are illustrated only for the purposes of convenience and briefness of description. In an actual application, the above-mentioned functional distribution may be completed by the different functional devices as required, that is, an internal structure of an apparatus is divided into different functional devices so that all or parts of the functions described as above are completed. working processes of the system, apparatus and device described as above may refer to corresponding processes in the embodiment of the aforementioned method, the descriptions thereof are omitted herein.

In the several embodiments provided by the present application, it should be understood that the disclosed apparatus and method may be implemented in other ways. For example, the embodiment of the apparatus described as above is only schematic, for example, the division of the devices or devices is only logic functional division, there may be additional division ways during actual implementation, for example, a plurality of devices or components may be combined or integrated on another system, or some features may be ignored or not executed. In addition, the displayed or discussed inter-coupling or direct coupling or communication connection may be implemented by virtue of some interfaces, and indirect coupling or communication connection among apparatuses or devices may be implemented in electrical, mechanical or other forms.

The devices described as separating components may be or not be physically separated, while components displayed as devices may be or not be physical devices, that is, the components may be located on one place or distributed on a plurality of network devices. Parts of all of the devices may be selected according to an actual demand to achieve the aim of the solution of the present embodiment.

In addition, all the functional devices in all the embodiments of the present application may be integrated in one processing device, or each of the devices physically exists alone, or two or more of the devices are integrated into one device. The above-mentioned integrated device may be implemented in both a form of hardware and a form of a software functional device.

When being implemented in the form of the software functional device and is sold or used as an independent product, the integrated device may be stored in a computer readable storage medium. Based on such understanding, the present application substantively, or a part thereof making a contribution to the prior art, or all or parts of the solutions may be reflected in a form of a software product, the computer software product is stored in a storage medium and includes several instructions to make a computer device (which may be a personal computer, a server or a network device and the like) or a processor execute all or parts of steps of the method in each of the embodiments of the present application. The aforementioned storage medium includes various media such as a universal serial bus flash disk, a mobile hard disk, an ROM (Read-Only Memory), an RAM (Random Access Memory), a magnetic disk or an optical disk to store a program code.

What is claimed is:

1. A hybrid automatic repeat request-acknowledgement (HARQ-ACK) transmission method, comprising:
   in response to that HARQ-ACK is transmitted on at least one physical uplink shared channel (PUSCH) of a plurality of PUSCHs in addition to a first PUSCH of the plurality of PUSCHs, ignoring, by a terminal device, a downlink assignment index (DAI) in a downlink control information (DCI) format used for one physical downlink control channel (PDCCH) when determining the HARQ-ACK, wherein the plurality of PUSCHs are scheduled by the one PDCCH; and
   transmitting, by the terminal device, the determined HARQ-ACK on the at least one PUSCH.

2. The transmission method according to claim 1, wherein the plurality of PUSCHs are repetition transmission of the same PUSCH or transport block (TB); or, the plurality of PUSCHs are transmissions of a plurality of independent PUSCHs scheduled by the same PDCCH.

3. The transmission method according to claim 1, wherein the ignoring, by the terminal device, the DAI in the DCI format used for the PDCCH when determining the HARQ-ACK comprises:
  determining, by the terminal device, the HARQ-ACK according to a determined method for HARQ-ACK transmission on a PUSCH without a corresponding PDCCH; or,
  determining, by the terminal device, the HARQ-ACK according to a determined method for HARQ-ACK transmission on a physical uplink control channel (PUCCH), and replacing, by the terminal device, a configuration parameter of HARQ-ACK corresponding to the PUCCH with a configuration parameter of HARQ-ACK corresponding to the PUSCH, wherein the configuration parameter is used for indicating whether spatial bundling is used for the HARQ-ACK.

4. The transmission method according to claim 1, wherein the ignoring, by the terminal device, the DAI in the DCI format used for the PDCCH when determining the HARQ-ACK comprises one of the following schemes:
  scheme 1: in the condition that a semi-static HARQ-ACK codebook is used:
  in response to that no downlink transmission or semi-persistent scheduling (SPS) physical downlink shared channel (PDSCH) with corresponding HARQ-ACK to be transmitted on a PUSCH is received, determining, by the terminal device, no transmission of HARQ-ACK on the PUSCH; and/or,
  in response to that only one downlink transmission with corresponding HARQ-ACK to be transmitted on a PUSCH is received and the only one downlink transmission is scheduled by a PDCCH using a DCI format 1_0 with DAI value of 1, or, in response to that only one SPS PDSCH with corresponding HARQ-ACK to be transmitted on a PUSCH is received, determining, by the terminal device, that the HARQ-ACK is HARQ-ACK corresponding to the downlink transmission or the SPS PDSCH; otherwise, determining, by the terminal device, that the HARQ-ACK is a semi-static HARQ-ACK codebook determined according to a candidate time domain resource set for a downlink transmission and a feedback timing set between a downlink transmission and an HARQ-ACK;
  scheme 2: in the condition that a semi-static HARQ-ACK codebook is used:
  in response to that no downlink transmission or SPS PDSCH with corresponding HARQ-ACK to be transmitted on a PUSCH is received, determining, by the terminal device, no transmission of HARQ-ACK on the PUSCH; and/or,
  in response to that at least one downlink transmission with corresponding HARQ-ACK to be transmitted on a PUSCH is received, determining, by the terminal device, that the HARQ-ACK is a semi-static HARQ-ACK codebook determined according to a candidate time domain resource set for a downlink transmission and a feedback timing set between a downlink transmission and an HARQ-ACK, or, determining, by the terminal device, the HARQ-ACK according to a determined method for HARQ-ACK transmission on a PUCCH, and replacing, by the terminal device, a configuration parameter of HARQ-ACK corresponding to the PUCCH with a configuration parameter of HARQ-ACK corresponding to the PUSCH, wherein the configuration parameter is used for indicating whether the spatial bundling is used for the HARQ-ACK.

5. The transmission method according to claim 1, wherein the ignoring, by the terminal device, the DAI in the DCI format used for the PDCCH when determining the HARQ-ACK comprises: in the condition that a dynamic HARQ-ACK codebook is used:
  in response to that no downlink transmission or SPS PDSCH with corresponding HARQ-ACK to be transmitted on a PUSCH is received, determining, by the terminal device, no HARQ-ACK transmission on the PUSCH; and/or,
  in response to that at least one downlink transmission or SPS PDSCH with corresponding HARQ-ACK to be transmitted on a PUSCH is received, determining, by the terminal device, that the HARQ-ACK is a dynamic HARQ-ACK codebook determined according to a DAI in a PDCCH corresponding to the downlink transmission.

6. A hybrid automatic repeat request-acknowledgement (HARQ-ACK) transmission method, comprising:
  in response to that HARQ-ACK is transmitted on at least one physical uplink shared channel (PUSCH) of a plurality of PUSCHs in addition to a first PUSCH of the plurality of PUSCHs, ignoring, by a network device, a downlink assignment index (DAI) in a downlink control information (DCI) format used for one physical downlink control channel (PDCCH) when determining a quantity of feedback bits of the HARQ-ACK, wherein the plurality of PUSCHs are scheduled by the one to the PDCCH; and
  receiving, by the network device, the HARQ-ACK on the at least one PUSCH according to the quantity of the feedback bits of the HARQ-ACK.

7. The transmission method according to claim 6, wherein the plurality of PUSCHs are repetition transmission of the same PUSCH or transport block (TB); or, the plurality of PUSCHs are transmissions of a plurality of independent PUSCHs scheduled by the same PDCCH.

8. The transmission method according to claim 6, wherein the ignoring, by the network device, the DAI in the DCI format used for the PDCCH when determining the quantity of the feedback bits of the HARQ-ACK comprises:
  determining, by the network device, the quantity of the feedback bits of the HARQ-ACK according to a determined method for HARQ-ACK transmission on a PUSCH without a corresponding PDCCH; or,
  determining, by the network device, the quantity of the feedback bits of the HARQ-ACK according to a determined method for HARQ-ACK transmission on a physical uplink control channel (PUCCH), and replacing, by the network device, a configuration parameter of HARQ-ACK corresponding to the PUCCH with a configuration parameter of HARQ-ACK corresponding to the PUSCH, wherein the configuration parameter is used for indicating whether the spatial bundling is used for the HARQ-ACK.

9. The transmission method according to claim 6, wherein the ignoring, by the network device, the DAI in the DCI format used for the PDCCH when determining the quantity of the feedback bits of the HARQ-ACK comprises one of the following schemes:
  scheme 1: in the condition that a semi-static HARQ-ACK codebook is used:
  in response to that no downlink transmission or semi-persistent scheduling (SPS) physical downlink shared channel (PDSCH) with corresponding HARQ-ACK to be transmitted on a PUSCH is transmitted, determining, by the network device, no reception of HARQ-ACK on the PUSCH; and/or, in response to that only one downlink transmission with corresponding HARQ-ACK to be transmitted on a PUSCH is transmitted and the only one downlink transmission is scheduled by a PDCCH using a DCI format 1_0 with DAI value of 1, or, in response to that only one SPS PDSCH with corresponding HARQ-ACK to be transmitted on a PUSCH is transmitted, determining, by the network device, that the quantity of the feedback bits of the HARQ-ACK is a quantity of feedback bits of HARQ-ACK corresponding to the downlink transmission or the SPS PDSCH; otherwise, determining, by the network device, that the quantity of the feedback bits of the HARQ-ACK is a quantity of feedback bits of a semi-static HARQ-ACK codebook determined according to a candidate time domain resource set for a downlink transmission and a feedback timing set between a downlink transmission and an HARQ-ACK;

scheme 2: in the condition that a semi-static HARQ-ACK codebook is used:

in response to that no downlink transmission or SPS PDSCH with corresponding HARQ-ACK to be transmitted on a PUSCH is transmitted, determining, by the network device, no reception of HARQ-ACK on the PUSCH; and/or, in response to that at least one downlink transmission with corresponding HARQ-ACK to be transmitted on a PUSCH is transmitted, determining, by the network device, that the quantity of the feedback bits of the HARQ-ACK is a quantity of feedback bits of a semi-static HARQ-ACK codebook determined according to a candidate time domain resource set for a downlink transmission and a feedback timing set between a downlink transmission and an HARQ-ACK, or, determining, by the network device, the quantity of the feedback bits of the HARQ-ACK according to a determined method for HARQ-ACK transmission on a PUCCH, and replacing, by the network device, a configuration parameter of HARQ-ACK corresponding to the PUCCH with a configuration parameter of HARQ-ACK corresponding to the PUSCH, wherein the configuration parameter is used for indicating whether the spatial bundling is used for the HARQ-ACK.

10. The transmission method according to claim 6, wherein the ignoring, by the network device, the DAI in the DCI format used for the PDCCH when determining the quantity of the feedback bits of the HARQ-ACK comprises:

in the condition that a dynamic HARQ-ACK codebook is used:

in response to that no downlink transmission or SPS PDSCH with corresponding HARQ-ACK to be transmitted on a PUSCH is transmitted, determining, by the network device, no reception of HARQ-ACK on the PUSCH; and/or, in response to that at least one downlink transmission with corresponding HARQ-ACK to be transmitted on a PUSCH is transmitted, determining, by the network device, that the quantity of the feedback bits of the HARQ-ACK is a quantity of feedback bits of a dynamic HARQ-ACK codebook determined according to a DAI in a PDCCH corresponding to the downlink transmission.

11. A terminal device, comprising:

a memory, configured to store an instruction;

a processor, configured to execute the instruction in the memory to:

in response to that hybrid automatic repeat request-acknowledgement (HARQ-ACK) is transmitted on at least one physical uplink shared channel (PUSCH) of a plurality of PUSCHs in addition to a first PUSCH of the plurality of PUSCHs, ignore a downlink assignment index (DAI) in a downlink control information (DCI) format used for one physical downlink control channel (PDCCH) when determining the HARQ-ACK, wherein the plurality of PUSCHs are scheduled by the one PDCCH; and transmit the determined HARQ-ACK on the at least one PUSCH; and a transceiver, configured to transmit or receive data under the control of the processor.

12. The terminal device according to claim 11, wherein the plurality of PUSCHs are repetition transmission of the same PUSCH or transport block (TB); or, the plurality of PUSCHs are transmissions of a plurality of independent PUSCHs scheduled by the same PDCCH.

13. The terminal device according to claim 11, wherein the processor is specifically configured to:

determine the HARQ-ACK according to a determined method for HARQ-ACK transmission on a PUSCH without a corresponding PDCCH; or, determine the HARQ-ACK according to a determined method for HARQ-ACK transmission on a physical uplink control channel (PUCCH), and replace a configuration parameter of HARQ-ACK corresponding to the PUCCH with a configuration parameter of HARQ-ACK corresponding to the PUSCH, wherein the configuration parameter is used for indicating whether the spatial bundling is used for the HARQ-ACK.

14. The terminal device according to claim 11, wherein the processor is specifically configured to one of the following schemes:

scheme 1: in the condition that a semi-static HARQ-ACK codebook is used:

in response to that no downlink transmission or semi-persistent scheduling (SPS) physical downlink shared channel (PDSCH) with corresponding HARQ-ACK to be transmitted on a PUSCH is received, determine no transmission of HARQ-ACK on the PUSCH; and/or, in response to that only one downlink transmission with corresponding HARQ-ACK to be transmitted on a PUSCH is received and the only one downlink transmission is scheduled by a PDCCH using a DCI format 1_0 with DAI value of 1, or, in response to that only one SPS PDSCH with corresponding HARQ-ACK to be transmitted on a PUSCH is received, determine that the HARQ-ACK is HARQ-ACK corresponding to the downlink transmission or the SPS PDSCH; otherwise, determine that the HARQ-ACK is a semi-static HARQ-ACK codebook determined according to a candidate time domain resource set for a downlink transmission and a feedback timing set between a downlink transmission and an HARQ-ACK;

scheme 2: in the condition that a semi-static HARQ-ACK codebook is used:

in response to that no downlink transmission or SPS PDSCH with corresponding HARQ-ACK to be transmitted on a PUSCH is received, determine no transmission of HARQ-ACK on the PUSCH; and/or, in response to that at least one downlink transmission with corresponding HARQ-ACK to be transmitted on a PUSCH is received, determine that the HARQ-ACK is a semi-static HARQ-ACK codebook determined according to a candidate time domain resource set for a downlink transmission and a feedback timing set between a downlink transmission and an HARQ-ACK, or, determine the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, wherein the configuration parameter is used for indicating whether the spatial bundling is used for the HARQ-ACK.

15. The terminal device according to claim 11, wherein the processor is specifically configured to: in the condition that a dynamic HARQ-ACK codebook is used:
   in response to that no downlink transmission or SPS PDSCH with corresponding HARQ-ACK to be transmitted on a PUSCH is received, determine no transmission of HARQ-ACK on the PUSCH; and/or,
   in response to that at least one downlink transmission or SPS PDSCH with corresponding HARQ-ACK to be transmitted on a PUSCH is received, determine that the HARQ-ACK is a dynamic HARQ-ACK codebook determined according to a DAI in a PDCCH corresponding to the downlink transmission.

16. A network device, comprising:
   a memory, configured to store an instruction;
   a processor, configured to execute the instruction in the memory to perform the method according to claim 9;
   a transceiver, configured to transmit or receive data under the control of the processor.

17. The network device according to claim 16, wherein the plurality of PUSCHs are repetition transmission of the same PUSCH or transport block (TB); or, the plurality of PUSCHs are transmissions of a plurality of independent PUSCHs scheduled by the same PDCCH.

18. The network device according to claim 16, wherein the processor is specifically configured to:
   determine the quantity of the feedback bits of the HARQ-ACK according to a determined method for HARQ-ACK transmission on a PUSCH without a corresponding PDCCH; or,
   determine the quantity of the feedback bits of the HARQ-ACK according to a determined method for HARQ-ACK transmission on a physical uplink control channel (PUCCH), and replace a configuration parameter of HARQ-ACK corresponding to the PUCCH with a configuration parameter of HARQ-ACK corresponding to the PUSCH, wherein the configuration parameter is used for indicating whether the spatial bundling is used for the HARQ-ACK.

19. The network device according to claim 16, wherein the processor is specifically configured to perform one of the following schemes:
   scheme 1: in the condition that a semi-static HARQ-ACK codebook is used:
   in response to that no downlink transmission or semi-persistent scheduling (SPS) physical downlink shared channel (PDSCH) with corresponding HARQ-ACK to be transmitted on a PUSCH are transmitted, determine no reception of HARQ-ACK on the PUSCH; and/or,
   in response to that only one downlink transmission with corresponding HARQ-ACK to be transmitted on a PUSCH is transmitted and the only one downlink transmission is scheduled by a PDCCH using a DCI format 1_0 with DAI value of 1, or, in response to that only one SPS PDSCH with corresponding HARQ-ACK to be transmitted on a PUSCH is transmitted, determine that the quantity of the feedback bits of the HARQ-ACK is the quantity of feedback bits of the HARQ-ACK corresponding to the downlink transmission or the SPS PDSCH; otherwise, determine that the quantity of the feedback bits of the HARQ-ACK is a quantity of feedback bits of a semi-static HARQ-ACK codebook determined according to a candidate time domain resource set for a downlink transmission and a feedback timing set between a downlink transmission and an HARQ-ACK;
   scheme 2: in the condition that a semi-static HARQ-ACK codebook is used:
   in response to that no downlink transmission or SPS PDSCH with corresponding HARQ-ACK to be transmitted on a PUSCH is transmitted, determine no reception of HARQ-ACK on the PUSCH; and/or,
   in response to that at least one downlink transmission with corresponding HARQ-ACK to be transmitted on a PUSCH is transmitted, determine that the quantity of the feedback bits of the HARQ-ACK is a quantity of feedback bits of a semi-static HARQ-ACK codebook determined according to a candidate time domain resource set for a downlink transmission and a feedback timing set between a downlink transmission and an HARQ-ACK, or, determine the quantity of the feedback bits of the HARQ-ACK according to a determined method for HARQ-ACK transmission on a PUCCH, and replace a configuration parameter of HARQ-ACK corresponding to the PUCCH with a configuration parameter of HARQ-ACK corresponding to the PUSCH, wherein the configuration parameter is used for indicating whether the spatial bundling is used for the HARQ-ACK.

20. The network device according to claim 16, wherein the processor is specifically configured to: in the condition that a dynamic HARQ-ACK codebook is used:
   in response to that no downlink transmission or SPS PDSCH with corresponding HARQ-ACK to be transmitted on a PUSCH is transmitted, determine no reception of HARQ-ACK on the PUSCH; and/or,
   in response to that at least one downlink transmission with corresponding HARQ-ACK to be transmitted on a PUSCH is transmitted, determine that the quantity of feedback bits of the HARQ-ACK is the quantity of feedback bits of a dynamic HARQ-ACK codebook determined according to a DAI in a PDCCH corresponding to the downlink transmission.

* * * * *